(12) United States Patent
Takeyama

(10) Patent No.: US 8,922,876 B2
(45) Date of Patent: Dec. 30, 2014

(54) OPTICAL AMPLIFYING DEVICE AND OPTICAL TRANSMISSION SYSTEM

(75) Inventor: Tomoaki Takeyama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 229 days.

(21) Appl. No.: 13/598,793

(22) Filed: Aug. 30, 2012

(65) Prior Publication Data

US 2013/0121689 A1 May 16, 2013

(30) Foreign Application Priority Data

Nov. 15, 2011 (JP) ................. 2011-249651

(51) Int. Cl.
*H01S 3/10* (2006.01)

(52) U.S. Cl.
USPC ............ 359/337; 359/337.2; 359/341.43

(58) Field of Classification Search
USPC ............... 359/337, 337.2, 341.43
See application file for complete search history.

(56) References Cited

U.S. PATENT DOCUMENTS 5,633,749 A * 5/1997 Shibuya ............ 359/341.43
6,262,835 B1 * 7/2001 Kosaka et al. ......... 359/337.12

FOREIGN PATENT DOCUMENTS

JP 6-334238 12/1994
JP 8-250785 9/1996

* cited by examiner

*Primary Examiner* — Mark Hellner
(74) *Attorney, Agent, or Firm* — Staas & Halsey LLP

(57) ABSTRACT

An optical amplifying device includes an optical amplification medium configured to be excited by excitation light and amplify signal light, a light loss detector configured to detect a light loss of an optical component optically connected to the optical amplification medium in the amplifying device, and a noise figure deterioration detector configured to detect, based on the light loss detected by the light loss detector, deterioration of a noise figure of the optical amplification medium.

14 Claims, 24 Drawing Sheets

| LOSS-INCREASE BLOCK | EXCITATION LIGHT POWER | back ASE POWER | back ASE TILT |
|---|---|---|---|
| ENTRY SIGNAL SYSTEM #1 | NO CHANGE | INCREASE | INCREASE |
| EXIT SIGNAL SYSTEM | INCREASE | INCREASE | INCREASE |
| EXCITATION SYSTEM | INCREASE | NO CHANGE | NO CHANGE |
| ENTRY SIGNAL-EXCITATION SYSTEM | INCREASE | NO CHANGE | INCREASE |
| ENTRY SIGNAL SYSTEM #2 | NO CHANGE | NO CHANGE | INCREASE |

| LOSS-INCREASE BLOCK | back ASE POWER | back ASE TILT |
|---|---|---|
| ENTRY SIGNAL SYSTEM #1 | INCREASE | INCREASE |
| EXCITATION SYSTEM | DECREASE | DECREASE |
| ENTRY SIGNAL-EXCITATION SYSTEM | DECREASE | NO CHANGE |
| ENTRY SIGNAL SYSTEM #2 | NO CHANGE | INCREASE |

| LOSS-INCREASE BLOCK | EXCITATION LIGHT POWER | EXCITATION LIGHT ABSORPTION RATIO |
|---|---|---|
| ENTRY SIGNAL SYSTEM | NO CHANGE | DECREASE |
| EXIT SIGNAL SYSTEM | INCREASE | DECREASE |
| EXCITATION SYSTEM | INCREASE | INCREASE |
| ENTRY SIGNAL-EXCITATION SYSTEM | INCREASE | INCREASE |

| LOSS-INCREASE BLOCK | EXCITATION LIGHT POWER | SIGNAL TILT |
|---|---|---|
| ENTRY SIGNAL SYSTEM | NO CHANGE | INCREASE |
| EXIT SIGNAL SYSTEM | INCREASE | INCREASE |
| EXCITATION SYSTEM | INCREASE | NO CHANGE |
| ENTRY SIGNAL-EXCITATION SYSTEM | INCREASE | INCREASE |

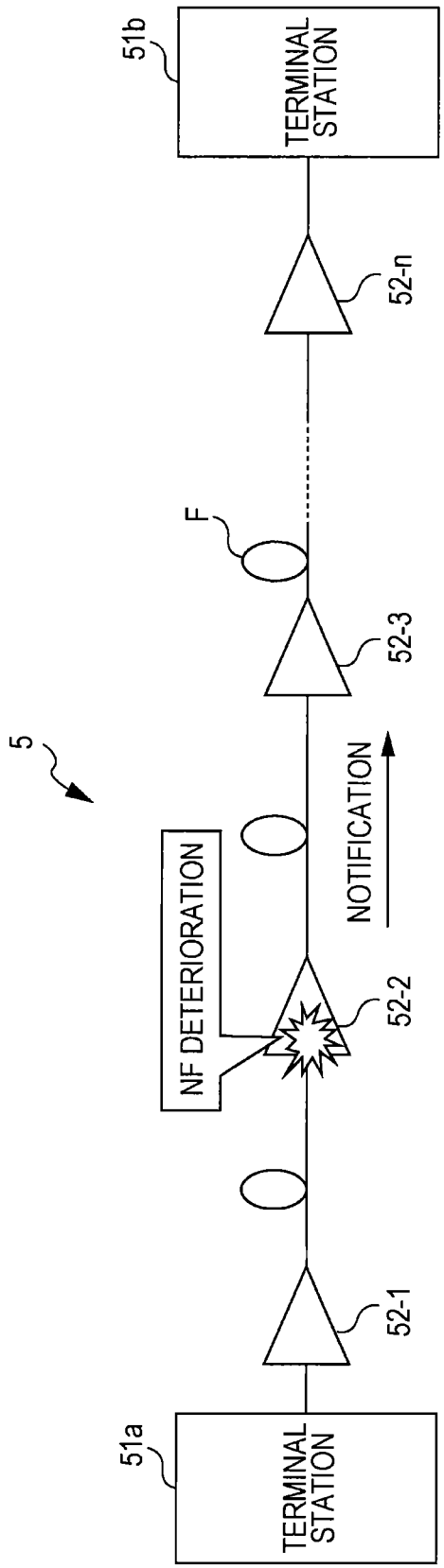

OPTICAL AMPLIFYING DEVICE AND OPTICAL TRANSMISSION SYSTEM

CROSS-REFERENCE TO RELATED APPLICATION

This application is based upon and claims the benefit of priority of the prior Japanese Patent Application No. 2011-249651, filed on Nov. 15, 2011, the entire contents of which are incorporated herein by reference.

FIELD

The embodiments discussed herein are related to an optical amplifying device performing optical amplification and an optical transmission system performing optical transmission.

BACKGROUND

Demand for communication traffic has significantly increased with the progress of multimedia networks, and multi-stage optical relay transmission utilizing optical amplifiers whose amplification media are Erbium Doped Fibers (EDFs) have played major roles for marketizing communication systems in a multimedia society.

As one of performance indexes of an optical amplifier performing the multi-stage optical relay transmission, a Noise Figure (NF) may be cited. The NF indicates how much the Optical Signal to Noise Ratio (OSNR) of a light signal on an output side is deteriorated with respect to the OSNR of a light signal on an input side. When the NF of the optical amplifier has been deteriorated, the OSNR of the light signal input to an optical receiving station turns out to be deteriorated.

In addition, when NF deterioration has become advanced above a certain level, a transmission error has occurred and communication becomes unable. Therefore, it is important to adequately detect the NF deterioration at an early stage.

As a technique of the related art, a technique has been proposed where an NF is obtained on the basis of the inverted population state of amplifying media.

Such a technique is disclosed in Japanese Laid-open Patent Publication No. 8-250785 and Japanese Laid-open Patent Publication No. 6-334238.

As general NF deterioration detection, a method has existed where, using an optical spectrum analyzer, the OSNRs of the input and output light signals of an optical amplifier are directly measured and the NF deterioration is detected.

In this case, an NF is calculated from the OSNR of the spectrum value of the light signal of each of the input stage and the output stage of the optical amplifier, measured in the optical spectrum analyzer, and the calculated NF is compared with an NF initial value, thereby detecting the NF deterioration.

However, since the optical spectrum analyzer is highly expensive, a configuration is not realistic where, for example, the optical spectrum analyzer is provided in each of optical amplifiers included in a system performing multi-stage optical relay and such NF deterioration detection as described above is performed, and hence, it is difficult to apply the configuration to an actual optical communication network.

SUMMARY

According to an aspect of the embodiments, an optical amplifying device includes an optical amplification medium configured to be excited by excitation light and amplify signal light, a light loss detector configured to detect a light loss of an optical component optically connected to the optical amplification medium in the amplifying device, and a noise figure deterioration detector configured to detect, based on the light loss detected by the light loss detector, deterioration of a noise figure of the optical amplification medium.

The object and advantages of the embodiments will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a diagram illustrating a table where a relationship between a loss-increase block and parameter information is summed up.

FIG. 19 is a diagram illustrating a table where a relationship between a loss-increase block and parameter information is summed up.

FIG. 23 is a diagram illustrating a table where a relationship between a loss-increase block and parameter information is summed up.

FIG. 24 is a diagram illustrating an example of a configuration of an optical transmission system.

DESCRIPTION OF EMBODIMENTS

Figure 1:
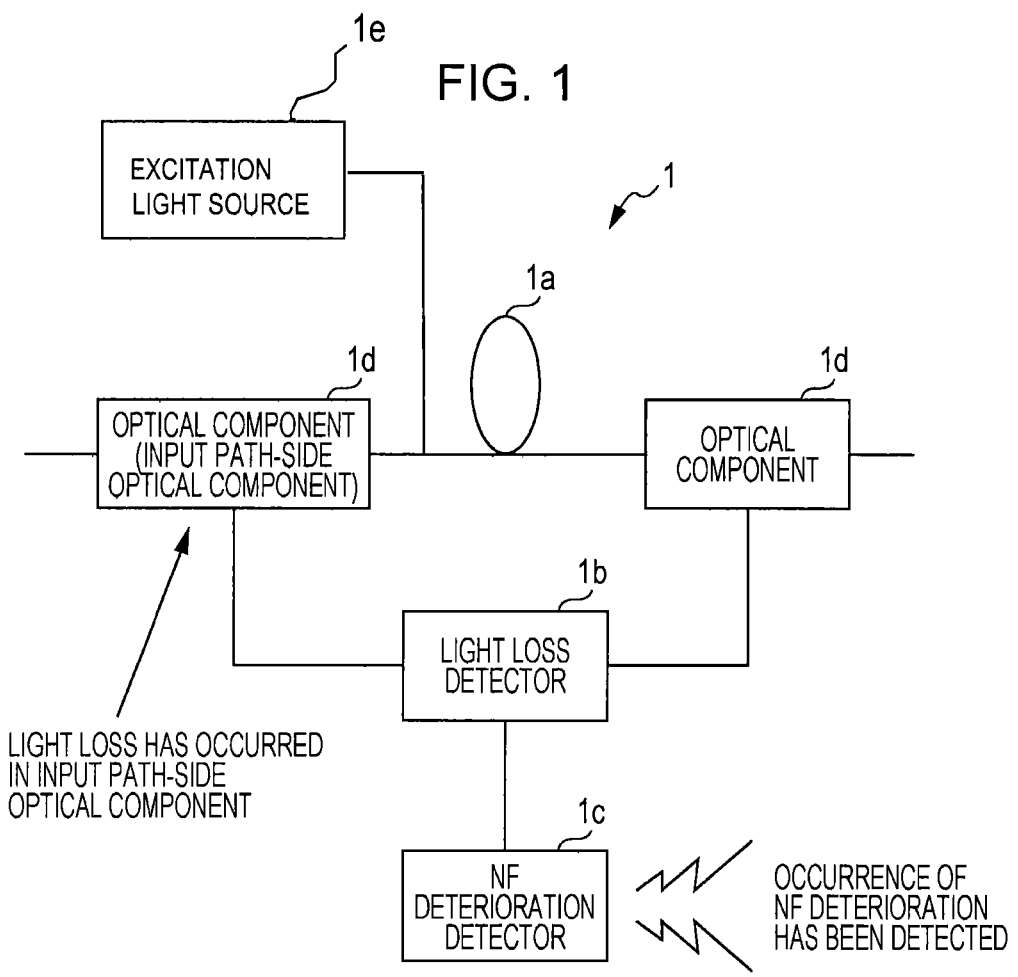
FIG. 1 is a diagram illustrating an example of a configuration of an optical amplifying device.

Hereinafter, the embodiments will be described with reference to the drawings. FIG. 1 is a diagram illustrating an example of the configuration of an optical amplifying device. An optical amplifying device 1 includes an optical amplification medium 1a, a light loss detector 1b, and a noise figure deterioration detector 1c. The optical amplifying device 1 may further include an excitation light source 1e.

The optical amplification medium is excited by excitation light from excitation light source 1e, and performs the optical amplification of signal light. An EDF corresponds to the optical amplification medium 1a, for example. The light loss detector 1b is located, for example, in the surrounding portion of the optical amplification medium 1a, and detects a light loss of an optically connected optical component 1d.

When a light loss of an input path-side optical component serving as the optical component 1d located on the input path for the optical amplification medium 1a has been detected, the noise figure deterioration detector 1c detects that the deterioration of a noise figure at the time of optical amplification has occurred. In addition, when noise figure deterioration greater than or equal to a given value has been detected, the noise figure deterioration detector 1c outputs an alarm signal owing to an alarm signal generator and gives notice to a user.

Here, in the loss deterioration of an optical component, when a loss increases owing to the deterioration of an optical component located on the input side of an EDF, the attachment of dusts to a connection surface, connectivity deterioration, or the like, a phenomenon occurs where the noise figure of an optical amplifier is deteriorated. Using this phenomenon, the optical amplifying device 1 adopts a configuration where, by detecting the light loss of the input path-side optical component located on the input path for the optical amplification medium 1a, it is detected that the deterioration of a noise figure at the time of optical amplification has occurred.

Accordingly, without using an optical spectrum analyzer, it may be possible to perform noise figure deterioration detection with an inexpensive configuration.

Next, a case will be described where the deterioration detection of a noise figure is performed using an optical spectrum analyzer. In addition, hereinafter, it is assumed that the optical amplification medium is an EDF, and the noise figure is referred to as an NF.

Figure 2:
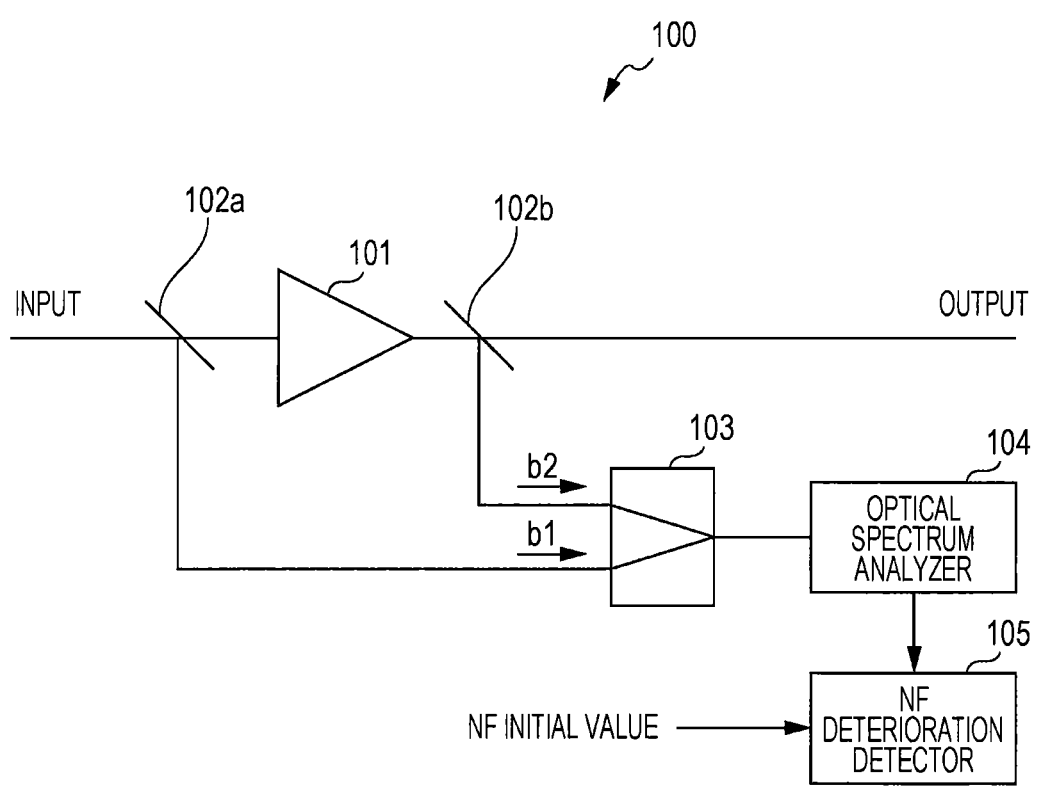
FIG. 2 is a diagram illustrating an example of a configuration of a device performing NF deterioration detection using an optical spectrum analyzer.

FIG. 2 is a diagram illustrating an example of the configuration of a device performing NF deterioration detection using an optical spectrum analyzer. An optical transmission device 100 includes an optical amplifier 101, demultiplexers 102a and 102b, an optical switch 103, an optical spectrum analyzer 104, and an NF deterioration detector 105.

The demultiplexer 102a splits input signal light into two, and outputs one of the input signal light and the other of the input signal light to an optical amplifier 101 and an optical switch 103, respectively. The optical amplifier 101 optically amplifies and outputs one of the split input signal light.

The demultiplexer 102b splits the amplified signal light into two, and output one of the amplified signal light and the other of the amplified signal light to a subsequent stage and the optical switch 103, respectively. The optical switch 103 receives and subjects input signal light (defined as input signal light b1) transmitted from the demultiplexer 102a and amplified signal light (defined as amplified signal light b2) transmitted from the demultiplexer 102b to optical switch processing, and outputs either light.

The optical spectrum analyzer 104 measures the optical spectrum of each of the input signal light b1 and the amplified signal light b2 output in a switching manner by the optical switch 103. The NF deterioration detector 105 calculates an NF from an optical spectrum measurement result. In addition, the NF deterioration detector 105 compares the NF with an NF initial value stored in advance, and detects the NF deterioration of the optical amplifier 101.

Here, when it is assumed that the OSNR of signal light input to the optical amplifier 101 is an OSNRin and the OSNR of signal light amplified and output by the optical amplifier 101 is an OSNRout, the NF of the optical amplifier 101 is expressed by a ratio between the OSNRs of input signal light and output signal light. Therefore, the NF of the optical amplifier 101 is calculated from the following Expression (1).

$$NF = OSNRout/OSNRin \quad (1)$$

Figure 3:
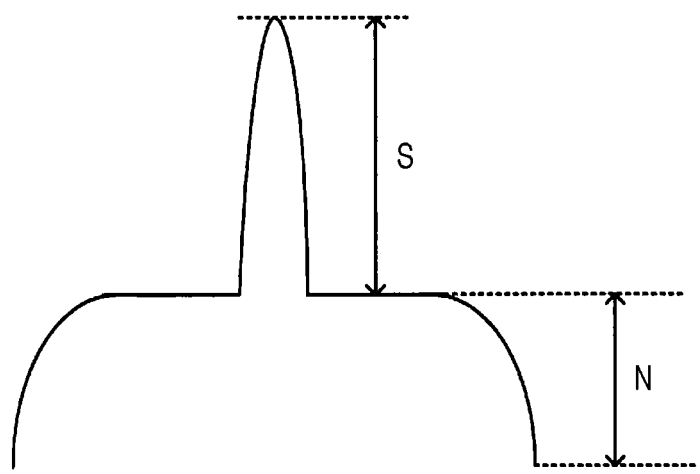
FIG. 3 is a diagram illustrating an optical spectrum.

FIG. 3 is a diagram illustrating an optical spectrum. Signal light includes an information component and a noise component, and when it is assumed that the level of the information component is S and the level of the noise component is N, the OSNR of the signal light is calculated as S/N.

In the case of FIG. 2, when it is assumed that the level of the information component of the input signal light b1 is S1 and the level of the noise component thereof is N1, OSNRin=S1/N1 is satisfied. In addition, when it is assumed that the level of the information component of the amplified signal light b2 is S2 and the level of the noise component thereof is N2, OSNRout=S2/N2 is satisfied.

Accordingly, in the NF deterioration detector 105, on the basis of the Expression (1), the NF is calculated from the OSNRin and the OSNRout after the measurement of the optical spectrum.

As described above, the spectrum value of the light signal of each of the input stage and the output stage of the optical amplifier 101 is measured in the optical spectrum analyzer 104, thereby calculating the NF, and the calculated NF is compared with the NF initial value stored in advance. Therefore, it may be possible to detect the NF deterioration.

However, since the optical spectrum analyzer is expensive, a configuration is not realistic where the optical spectrum analyzer is provided in each of optical amplifiers included in a system performing multi-stage optical relay and such NF deterioration detection as described above is performed.

In addition, to identify in which optical amplifier in a plurality of optical amplifiers performing multi-stage optical relay on an optical communication network the NF deterioration has occurred has not been realized in the past.

The present technology is made in view of such a point as described above and provides an optical amplifying device detecting NF deterioration with an inexpensive configuration. Furthermore, the present technology provides an optical transmission system detecting NF deterioration with an inexpensive configuration and capable of easily identifying an optical amplifier in which the NF deterioration has occurred, on an optical communication network.

Next, an optical amplifying device of a first embodiment will be described using FIG. 4 to FIG. 9. Here, as described above, the NF deterioration occurs at the time of the loss deterioration of each optical component disposed on the input side of an EDF. Accordingly, an optical amplifying device illustrated hereinafter has a configuration where NF deterioration is not detected by measuring the OSNRs of the input and the output of an optical amplifier using an optical spectrum analyzer but the NF deterioration is detected from the detection result of the loss deterioration of an optical component.

Figure 4:
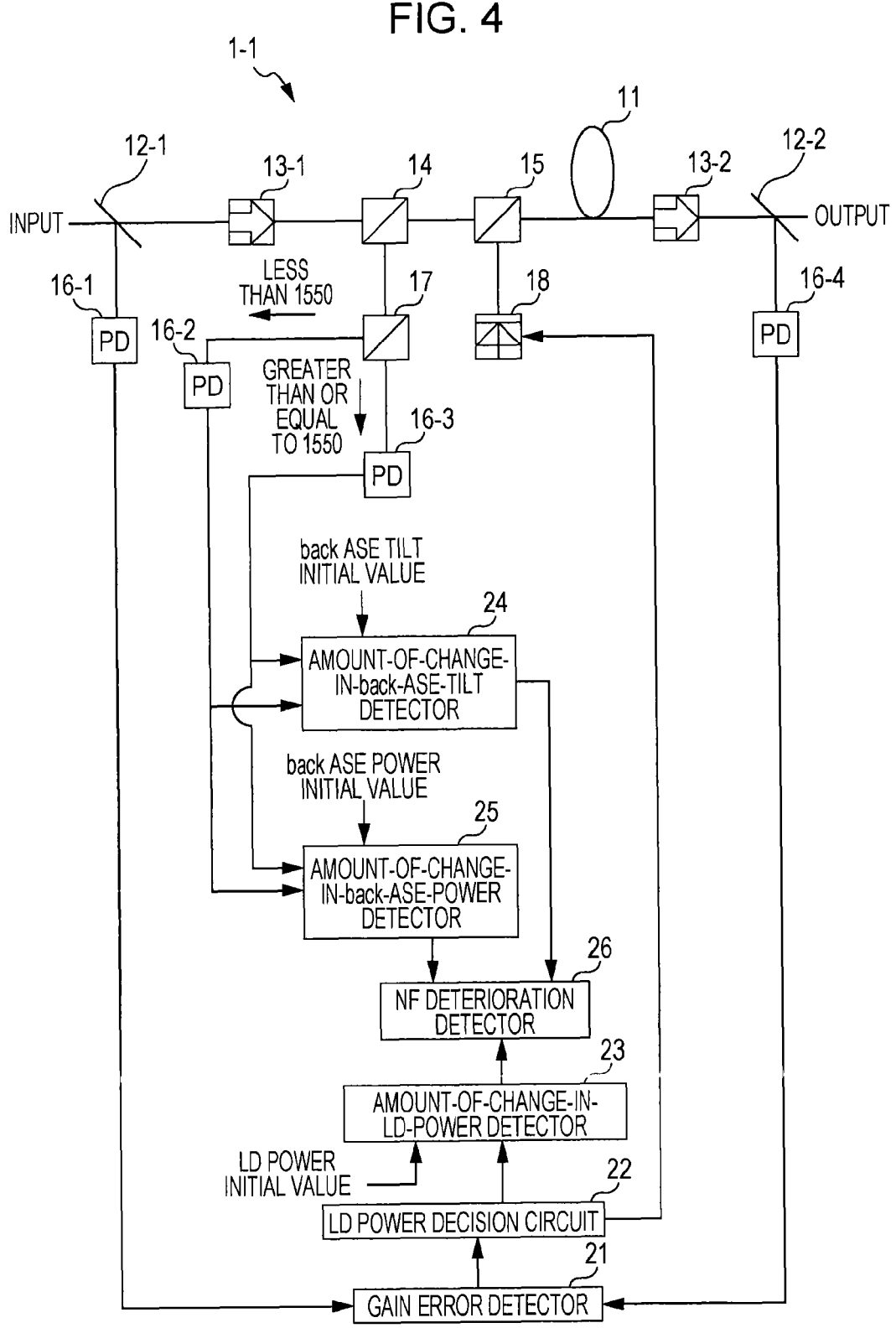
FIG. 4 is a diagram illustrating an example of a configuration of an optical amplifying device.

FIG. 4 is a diagram illustrating an example of the configuration of an optical amplifying device. An optical amplifying device 1-1 of the first embodiment is a device performing optical amplification by forward pumping an EDF 11.

The optical amplifying device 1-1 includes the EDF 11, signal light demultiplexers 12-1 and 12-2, isolators 13-1 and 13-2, a back Amplified Spontaneous Emission (ASE) demultiplexer 14, an excitation light multiplexer 15, Photo Diodes (PD) 16-1 to 16-4, a wavelength filter 17, a Laser Diode (LD: excitation light source) 18, a gain error detector 21, an LD power decision circuit 22, an amount-of-change-in-LD-power detector 23, an amount-of-change-in-back-ASE-tilt detector 24, an amount-of-change-in-back-ASE-power detector 25, and an NF deterioration detector 26.

In addition, the light loss detector 1b in FIG. 1 includes the functions of the amount-of-change-in-LD-power detector 23, the amount-of-change-in-back-ASE-tilt detector 24, and the amount-of-change-in-back-ASE-power detector 25. The NF deterioration detector 1c in FIG. 1 includes the function of the NF deterioration detector 26.

Signal light input to the optical amplifying device 1-1 is split into two by the signal light demultiplexer 12-1. One of the split signal light is output to the isolator 13-1, and the other of the split signal light is output to the PD 16-1. The isolator 13-1 outputs the received signal light to the back ASE demultiplexer 14.

In addition, the isolator is a device only allowing desired light to pass therethrough in the direction of an arrow in the drawing and not allowing light to pass therethrough in the inverse direction thereof. By disposing the isolator 13-1 in the input stage of the EDF 11, the isolator 13-1 blocks amplified spontaneous emission light (ASE light) from flowing to an optical fiber transmission path on the input side of the signal light, the ASE light leaking out in a direction opposite to the travelling direction of an amplified light output from the EDF 11 (hereinafter, the ASE light will be referred to as back ASE).

The back ASE demultiplexer 14 receives and outputs the signal light output from the isolator 13-1 to the excitation light multiplexer 15. In addition, the back ASE demultiplexer 14 receives the back ASE leaking backward from the EDF 11, and outputs the back ASE in a demultiplexing manner to the wavelength filter 17 side.

The excitation light multiplexer 15 multiplexes the signal light output from the back ASE demultiplexer 14 and excitation light output from the LD 18, and causes the multiplexed light to enter the EDF 11, thereby forward pumping the EDF 11.

In the EDF 11, $Er^{3+}$ ions added to a fiber core are excited owing to excitation light, and the signal light travels within the core where $Er^{3+}$ ions are in an excitation state. Accordingly, stimulated emission occurs and the optical power of the signal light is amplified.

The isolator 13-2 outputs, to the signal light demultiplexer 12-2, the signal light amplified and output by the EDF 11. In addition, when the amplified light output from the EDF 11 is reflected from an optical fiber transmission path, an optical connector, or the like, and the reflected light enters the EDF 11 again, loop oscillation occasionally occurs within the EDF 11. Therefore, the isolator 13-2 is disposed in the output stage of the EDF 11, and the isolator 13-2 blocks the reflected light.

The signal light demultiplexer 12-2 splits the signal light output from the isolator 13-2 into two, and outputs one of the signal light and the other of the signal light to a subsequent stage and the PD 16-4, respectively.

The PD 16-1 monitors the power of the signal light output from the signal light demultiplexer 12-1, and generates an electric input power signal. In addition, the PD 16-4 monitors the power of the signal light output from the signal light demultiplexer 12-2, and generates an electric output power signal.

The gain error detector 21 detects an error with respect to a gain to be a target, on the basis of the input power signal and the output power signal. The LD power decision circuit 22 decides excitation light power so that the detected gain error is reduced, and outputs, to the LD 18, a driving signal used for causing the decided excitation light power to be output from the LD 18. The LD 18 emits excitation light with an excitation power based on the driving signal.

The amount-of-change-in-LD-power detector 23 detects the amount of change in an LD power on the basis of an LD power decision value decided in the LD power decision circuit 22 and an LD power initial value stored in advance.

On the other hand, the wavelength filter 17 performs filtering processing on the back ASE output from the back ASE demultiplexer 14, and splits the back ASE into two bands on a short wavelength side and a long wavelength side to output the two bands.

In this example, the back ASE less than 1550 nm is output to the PD 16-2 as the short wavelength side, and the back ASE greater than or equal to 1550 nm is output to the PD 16-3 as the long wavelength side.

The PD 16-2 monitors the power of the short wavelength-side back ASE less than 1550 nm, and generates an electric short wavelength-side back ASE power signal. In addition, the PD 16-3 monitors the power of the long wavelength-side back ASE greater than or equal to 1550 nm, and generates an electric long wavelength-side back ASE power signal.

The amount-of-change-in-back-ASE-tilt detector 24 calculates the tilt of the back ASE from the short wavelength-side back ASE power signal and the long wavelength-side back ASE power signal. In addition, on the basis of the calculated back ASE tilt and a back ASE tilt initial value stored in advance, the amount-of-change-in-back-ASE-tilt detector 24 detects the amount of change in the back ASE tilt.

The amount-of-change-in-back-ASE-power detector 25 calculates the power of the back ASE including both bands on the short wavelength side and the long wavelength side, from the short wavelength-side back ASE power signal and the long wavelength-side back ASE power signal. In addition, the amount-of-change-in-back-ASE-power detector 25 detects the amount of change in the back ASE power on the basis of the calculated back ASE power and a back ASE power initial value stored in advance.

The NF deterioration detector 26 detects the NF deterioration on the basis of the amount of change in an LD power detected in the amount-of-change-in-LD-power detector 23, the amount of change in back ASE tilt detected in the amount-of-change-in-back-ASE-tilt detector 24, and the amount of change in back ASE power detected in the amount-of-change-in-back-ASE-power detector 25. In addition, the NF deterioration detector 26 notifies the outside of the detection result (for example, output an alarm when NF deterioration exceeding a normal range has been detected, or the like).

In addition, the above-mentioned LD power initial value, back ASE tilt initial value, and back ASE power initial value are stored in a storage unit, and may be arbitrarily set from the outside.

Here, the operation of the above-mentioned optical amplifying device 1-1 will be collectively described. In the optical amplifying device 1-1, gain stabilization control is performed where the input signal light and the output signal light are monitored, an error with respect to the gain to be a target is detected, and the power of the excitation LD is decided from the gain error.

In addition, the back ASE demultiplexer 14 for splitting the back ASE occurring backward from the EDF 11 is provided in the input stage of the excitation light multiplexer 15. The back ASE split in the back ASE demultiplexer 14 passes through the wavelength filter 17 dividing the amplification band of the EDF 11 into two bands and the power of each of the two bands is monitored.

In addition, the back ASE power as a whole is calculated from the sum of back ASE power on the short wavelength side and a back ASE power on the long wavelength side. Furthermore, by subtracting the back ASE power on the long wavelength side from the back ASE power on the short wavelength side, the tilt of the back ASE is calculated.

In addition, it is observed how three pieces of parameter information have changed with time with respect to the parameter information of the individual initial values of the excitation light power, the back ASE power, and the back ASE tilt, stored in advance. The amounts of change in the three pieces of parameter information turn out to exhibit different behaviors depending on a location where the loss of an optical component has increased.

Figure 5:
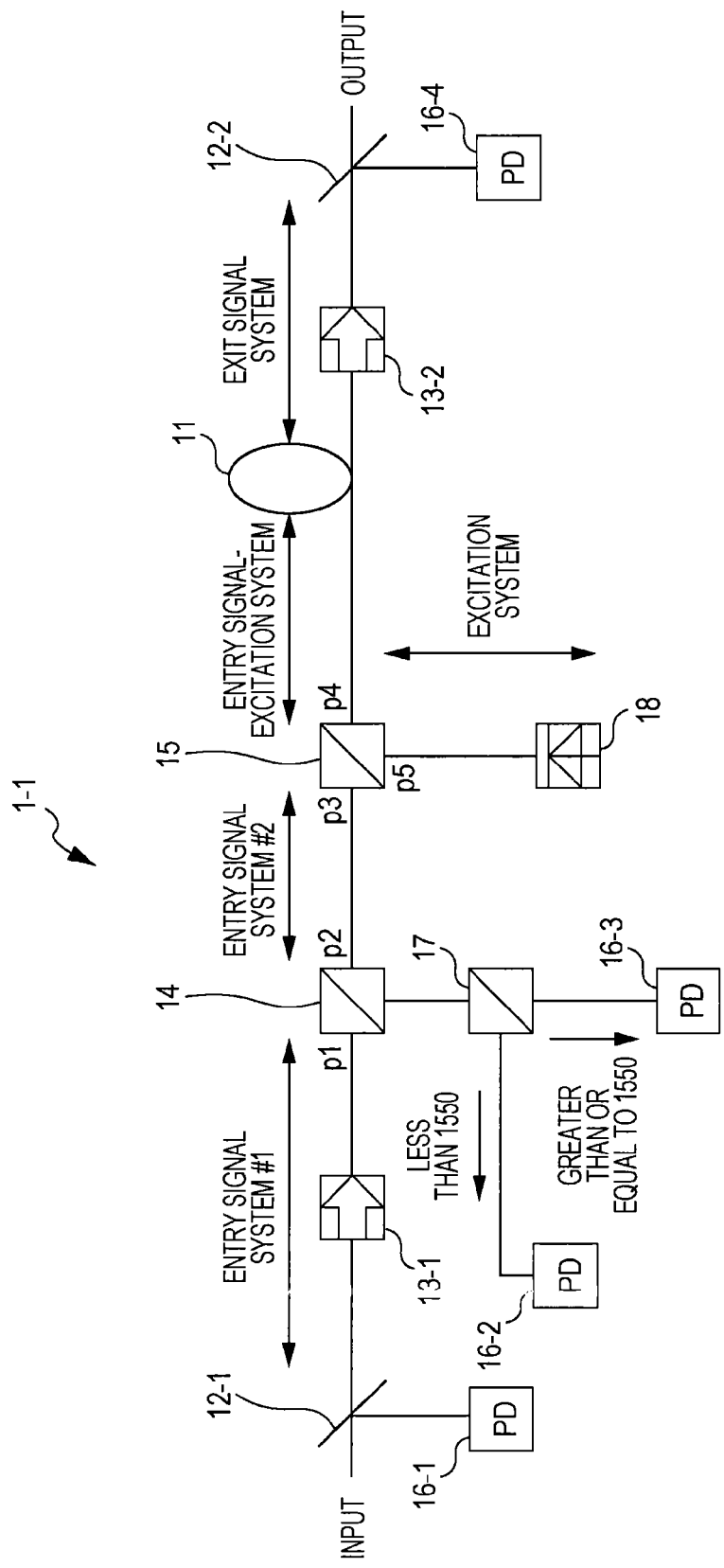
FIG. 5 is a diagram illustrating a type of a location where a loss increases.

The type of a location where a loss increases will be described. FIG. 5 is a diagram illustrating the type of a location where a loss increases. In the optical amplifying device 1-1, it may be possible to divide a location where a loss increases into five main blocks. The five blocks include an entry signal system #1, an entry signal system #2, an entry signal-excitation system, an exit signal system, and an excitation system.

The entry signal system #1 ranges from the input end of the optical amplifying device 1-1 to a signal light input port p1 of the back ASE demultiplexer 14. The entry signal system #2 ranges from a signal light output port p2 of the back ASE demultiplexer 14 to a signal light input port p3 of the excitation light multiplexer 15.

The entry signal-excitation system ranges from a multiplexed-light output port p4 of the excitation light multiplexer 15 to the input end of the EDF 11. The exit signal system corresponds to a range subsequent to the output end of the EDF 11. The excitation system ranges from the LD 18 to an excitation light input port p5 of the excitation light multiplexer 15.

Next, it will be described how the characteristics of the excitation light power (LD power), the back ASE power, and the back ASE tilt change with respect to the loss increase of each block.

Figure 6:
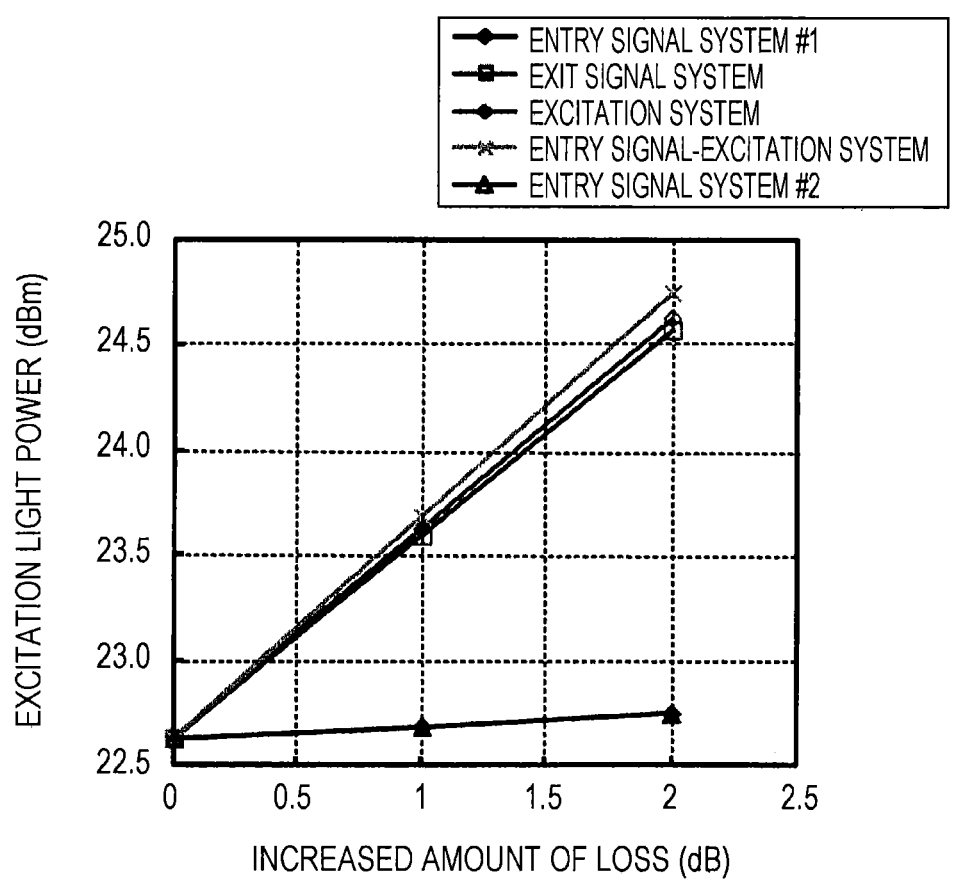
FIG. 6 is a diagram illustrating a relationship between an excitation light power and an increased amount of a loss.

FIG. 6 is a diagram illustrating a relationship between the excitation light power and the increased amount of a loss. A horizontal axis is the increased amount of a loss (dB), and a vertical axis is the excitation light power (dBm).

As for the excitation light power, when the losses of the individual blocks of the exit signal system, the excitation system, and the entry signal-excitation system have increased, the excitation light power increases by the increased amount of a loss.

In addition, the excitation light power increases very little with respect to the loss increases of the entry signal system #1 and the entry signal system #2. In general, the gain of the EDF 11 is about 20 dB, and an input power is about one hundredth of an output power, and a negligible power. Accordingly, since a conversion efficiency is about 50%, for example, in the case of 0.98 μm, the excitation light power becomes a power about twice as much as the output power.

Accordingly, since, compared with the excitation light power, the amount of change in the input light power is about one two-hundredth thereof and an insignificant amount, the loss increases of the entry signal system #1 and the entry signal system #2 do not affect the excitation light power.

Figure 7:
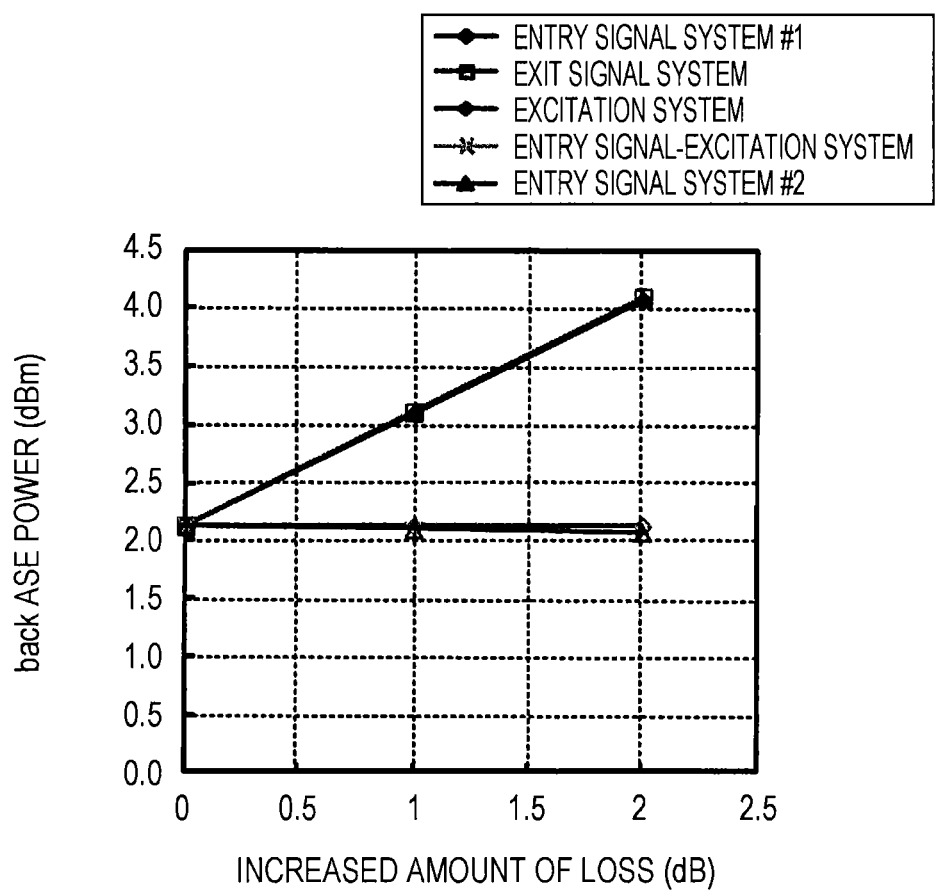
FIG. 7 is a diagram illustrating a relationship between a back ASE power and an increased amount of a loss.

FIG. 7 is a diagram illustrating a relationship between the back ASE power and the increased amount of a loss. A horizontal axis is the increased amount of a loss (dB), and a vertical axis is the back ASE power (dBm).

The back ASE power does not change with respect to the loss increase of the excitation system. The reason is that the LD 18 operates so as to increase the excitation light power by the loss increase of the excitation system and as a result, the excitation light power input to the EDF 11 does not change.

With respect to the loss increase of the exit signal system, the back ASE increases. The reason is that when the loss of the exit signal system has increased, while the excitation light power is increased so as to compensate the loss increase and the gain of the EDF 11 becomes large, the back ASE is amplified with an increase in the gain of the EDF 11.

Also as for the entry signal system #1, in the same way, the gain of the EDF 11 increases so as to compensate a loss increase, and along therewith, the back ASE also increases. As for the entry signal system #2, while the back ASE occurring from the EDF 11 increases on the same ground as the entry signal system #1, since the back ASE passes through a path of a loss increase during being monitored, the back ASE decreases by that amount. Being cancelled out by two effects, as a result, it is observed that the back ASE changes very little.

As for the entry signal-excitation system, even if the loss of the excitation system has increased, an operation is performed so as to increase the power of the LD 18 by that amount, and the excitation light power to be input to the EDF 11 does not change. Therefore, the entry signal-excitation system plays no role in the back ASE power. In the same way as the entry signal system #2, while the back ASE output from the EDF 11 increases, the back ASE attenuates by that amount owing to a loss increase and cancelled out, and as a result, it is observed that the back ASE changes very little.

Figure 8:
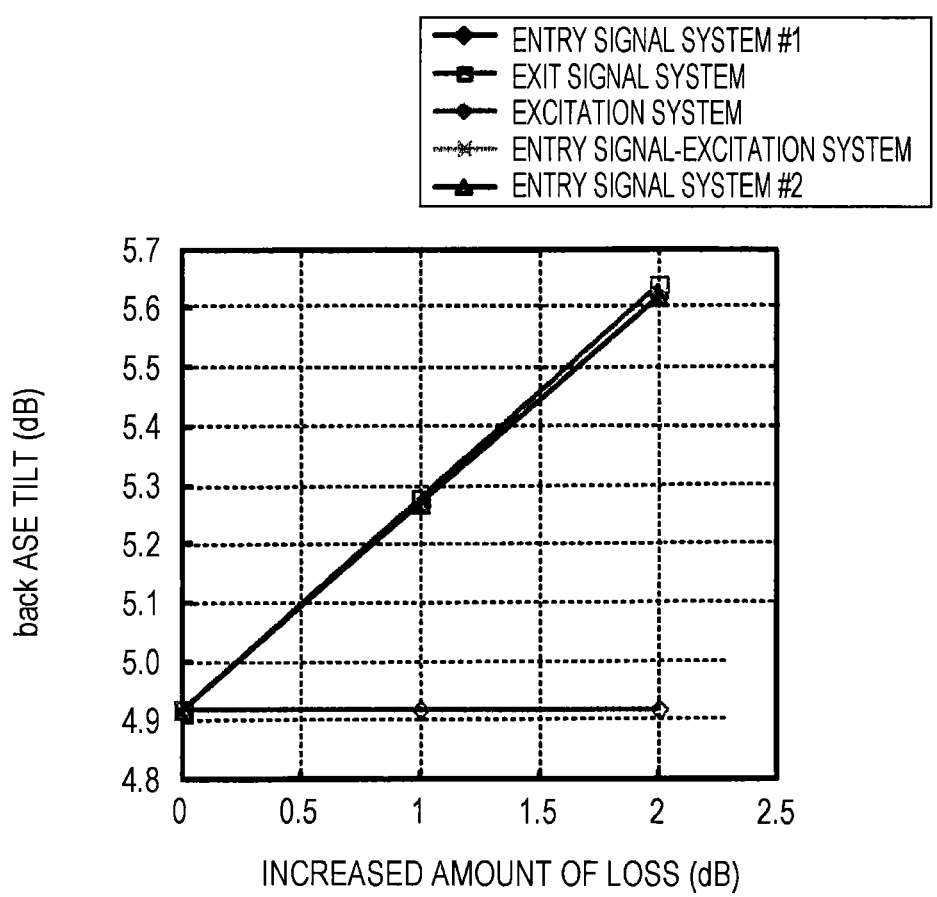
FIG. 8 is a diagram illustrating a relationship between a back ASE tilt and an increased amount of a loss.

FIG. 8 is a diagram illustrating a relationship between a back ASE tilt and the increased amount of a loss. A horizontal axis is the increased amount of a loss (dB), and a vertical axis is a back ASE tilt (dB).

As for the back ASE tilt, the back ASE does not change with respect to the loss increase of the excitation system. The reason is that the power of the LD 18 increases by the increased amount of the loss of the excitation system and the excitation light power to be input to the EDF 11 does not change.

With respect to the loss increase of the exit signal system, as described in the description of the back ASE power, the back ASE increases. While the back ASE increases with an increase in the gain of the EDF 11, it is easy for the gain of the EDF 11 to significantly increase on the short wavelength side. Accordingly, as for the tilt of the back ASE, the gain of the short wavelength of an amplification band also more significantly increases.

As for the entry signal system #1, the entry signal system #2, and the entry signal-excitation system, since the back ASE output from the EDF 11 increases as described above, the back ASE tilt also becomes large along therewith.

Figure 9:
FIG. 9 is a diagram illustrating a table where a relationship between a loss-increase block and parameter information is summed up.

Next, a table will be described where a relationship between the above-mentioned five loss-increase blocks and three pieces of parameter information is summed up. FIG. 9 is a diagram illustrating a table where a relationship between a loss-increase block and parameter information is summed up.

As a state illustrated in a table T1, a behavior is exhibited where when the loss of the entry signal system #1 has increased, while the excitation light power does not change, the back ASE power and the back ASE tilt increase.

In addition, a behavior is exhibited where when the loss of the exit signal system has increased, the excitation light power, the back ASE power, and the back ASE tilt increase. Furthermore, a behavior is exhibited where when the loss of the excitation system has increased, the excitation light power increases and the back ASE power and the back ASE tilt do not change.

In addition, a behavior is exhibited where when the loss of the entry signal-excitation system has increased, the excitation light power increases, the back ASE power does not change, and the back ASE tilt increases. Furthermore, a behavior is exhibited where when the loss of the entry signal system #2 has increased, while the excitation light power and the back ASE power do not change, the back ASE tilt increases.

As may be seen from the table T1, it is understood that three behavior patterns including the excitation light power, the back ASE power, and the back ASE tilt do not overlap with one another, and exhibit unique behaviors depending on loss-increase blocks.

The NF deterioration detector 26 stores therein the table T1 in advance, and it may be possible to identify a loss-increase block on the basis of the amount of change in the LD power, the amount of change in the back ASE tilt, and the amount of change in the back ASE power.

Furthermore, since the loss deterioration of three blocks including the entry signal system #1, the entry signal system #2, and the entry signal-excitation system occurs with no change as the NF deterioration, a user is notified with an NF deterioration alarm being output when a behavior indicated in the table T1 is recognized with respect to the entry signal system #1, the entry signal system #2, and the entry signal-excitation system.

In addition, as for the loss increases of the excitation system and the exit signal system, when the LD 18 has the margin of the excitation power, the power of the LD 18 only increases, and the loss increases of the excitation system and the exit signal system do not influence the performance of the optical amplifier. However, when a state has occurred where it is difficult to achieve a gain to be a target even if the power of the LD 18 has reached the upper limit thereof, it is useful for detecting where a point causing that exists.

In addition, if what is wrong has been understood, it may be possible to recover by only changing an optical component in the corresponding block at the time of a failure without replacing the whole optical amplifier with a new one, and it may be possible to reduce the amounts of cost and time used for recovery.

Here, an example of the specific numerical value setting of each component configuring the optical amplifying device 1-1 will be described. As for the back ASE demultiplexer 14 splitting the back ASE from a path through which the signal light flows, a coupler having the splitting ratio of, for example, 20:1 is used. The reason is that if a coupler having the large splitting ratio of 1:1 or the like is used, the loss of a path through which the signal light flows increases and an NF is deteriorated.

In addition, as the wavelength filter 17, here, a filter whose boundary is 1550 nm is used. It is assumed that excitation is adopted where an excitation light wavelength is 0.98 µm. It is assumed that the number of wavelengths of the optical amplifying device 1-1 is 40 waves in a C band.

It is assumed that an input signal light level is −20 dBm/ch. It is assumed that a gain target value is 23 dB. It is assumed that the length of the EDF 11 is 18 m. In addition, the initial value of the excitation light power to be stored is 22.6 dBm as may be seen from FIG. 6, the back ASE power initial value is 2.1 dBm from FIG. 7, and the back ASE tilt initial value is 4.9 dB from FIG. 8.

Furthermore, it is assumed that a threshold value for determining that the excitation light power has increased is, for example, +1.0 dB. It is assumed that a threshold value for determining that the back ASE power has increased is, for example, +1.0 dB. It is assumed that a threshold value for determining that the back ASE tilt has increased is, for example, +0.3 dB. Using the threshold value, it may be possible to detect a loss increase when the loss of each block has been deteriorated by 1 dB or more. Accordingly, it may also be possible to detect NF deterioration when an NF has been deteriorated by 1 dB or more.

Next, as an example of an actual operation, a flow will be illustrated when the loss of the entry signal system #1 has increased by 2 dB. First, as illustrated in FIG. 6, the excitation light power increases by only 0.1 dB. Since the threshold value for determining that the excitation light power has increased is +1.0 dB, it is determined that the excitation light power does not change. As illustrated in FIG. 7, the back ASE power increases by 2 dB.

Since the threshold value for determining that the back ASE power has increased is +1.0 dB, it is determined that the back ASE power has increased. As illustrated in FIG. 8, the back ASE tilt increases by 0.7 dB. Since the threshold value for the increase of the back ASE tilt is 0.3 dB, it is determined that the back ASE tilt has increased.

When the above-mentioned result is compared with the table T1 in FIG. 9, it may be possible to determine that the loss of the entry signal system #1 has increased, and it may be possible to raise an alarm for the NF deterioration detection.

Figure 10:
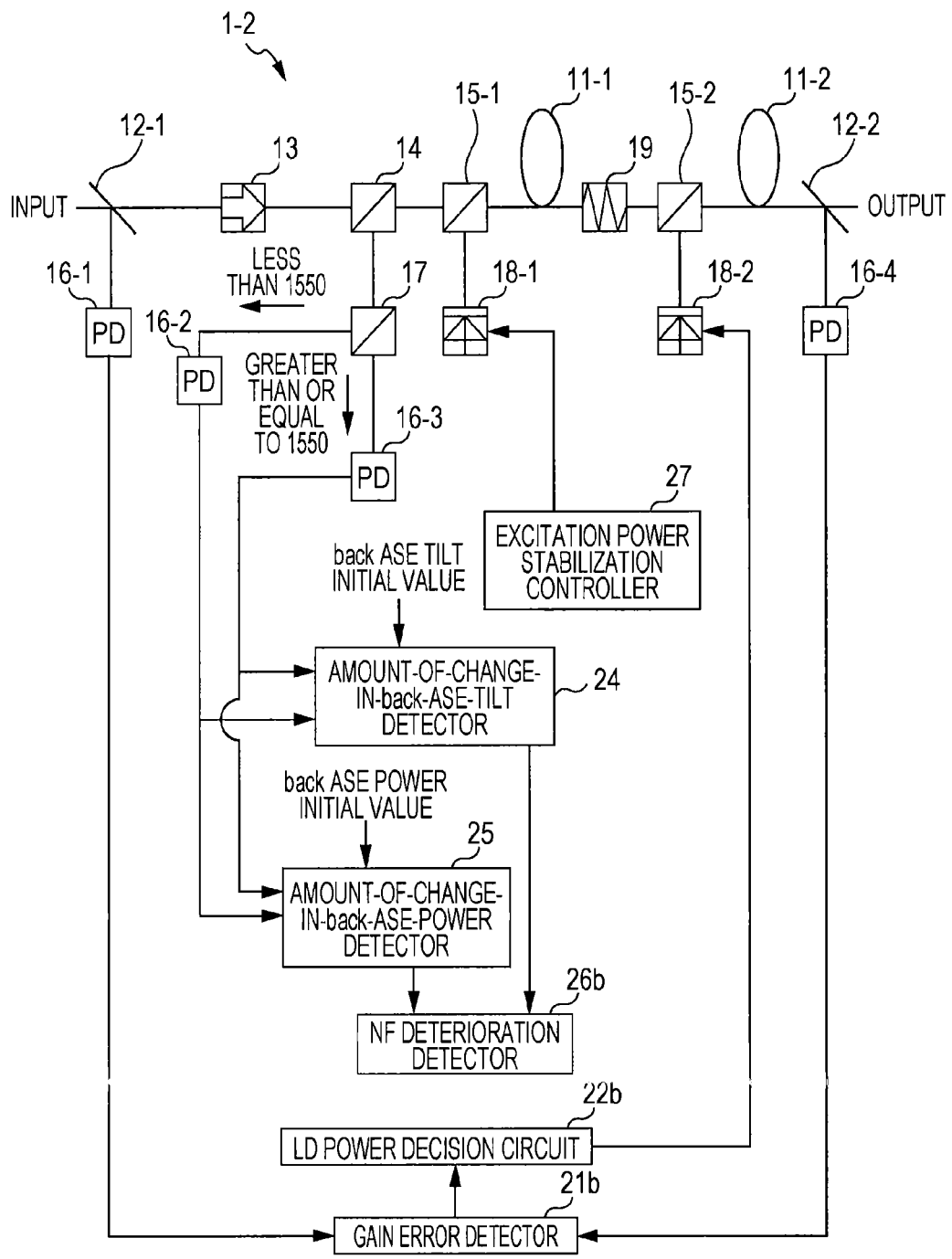
FIG. 10 is a diagram illustrating an example of a configuration of an optical amplifying device.

Next, an optical amplifying device of a second embodiment will be described using FIG. 10 to FIG. 14. FIG. 10 is a diagram illustrating an example of the configuration of the optical amplifying device. In addition, the optical amplifying device will be described with a focus on a point different from the configuration element of the optical amplifying device 1-1.

An optical amplifying device 1-2 includes EDFs 11-1 and 11-2, signal light demultiplexers 12-1 and 12-2, an isolator 13, a back ASE demultiplexer 14, excitation light multiplexers 15-1 and 15-2, PDs 16-1 to 16-4, a wavelength filter 17, LDs 18-1 and 18-2, a Gain Equalizer (GEQ) 19, a gain error detector 21b, an LD power decision circuit 22b, an amount-of-change-in-back-ASE-tilt detector 24, an amount-of-change-in-back-ASE-power detector 25, an NF deterioration detector 26b, and an excitation power stabilization controller 27. The excitation power stabilization controller may be configured using at least one of, for example, an IC, an ASIC, an FPGA, and a processor.

In addition, the light loss detector 1b in FIG. 1 includes the functions of the amount-of-change-in-back-ASE-tilt detector 24 and the amount-of-change-in-back-ASE-power detector 25. The NF deterioration detector 1c in FIG. 1 includes the function of the NF deterioration detector 26b.

While a one-stage EDF is adopted in the optical amplifying device 1-1 of the first embodiment, the case of a two-stage EDF is adopted in the optical amplifying device 1-2 of the second embodiment.

By adopting the two-stage EDF, the GEQ 19 performing gain equalization control and a medium such as a Variable Optical Attenuator (VOA) not illustrated are disposed between the EDF 11-1 and the EDF 11-2, and hence, it may be possible to adjust and control a balance between the NF of the whole optical amplifier and the desired power of excitation light.

The EDF 11-1 and the EDF 11-2 are pumped by the LD 18-1 and the LD 18-2, respectively. When the gain of the EDF 11-1 at the preceding stage is caused to become preferably large, it may be possible to raise the input level of the EDF 11-2 at the subsequent stage. Therefore, the NF of the optical amplifier is improved. Accordingly, owing to the excitation power stabilization controller 27, the LD 18-1 is controlled with maximum desirable power.

In the same way as in the first embodiment, the LD 18-2 performs gain stabilization control. In other words, the PD 16-1 monitors the power of the signal light output from the signal light demultiplexer 12-1, and generates an electric input power signal. In addition, the PD 16-4 monitors the power of the signal light output from the signal light demultiplexer 12-2, and generates an electric output power signal.

On the basis of the input power signal and the output power signal, the gain error detector 21b detects an error with respect to a gain to be a target. The LD power decision circuit 22b decides an excitation light power so that the detected gain error is reduced, and outputs, to the LD 18-2, a driving signal used for causing the decided excitation light power to be output from the LD 18-2. The LD 18-2 emits excitation light with an excitation power based on the driving signal. In addition, since the detection operation for the amounts of change in the back ASE power and the back ASE tilt is the same as the first embodiment, the description thereof will be omitted.

On the other hand, in the optical amplifying device 1-2, the NF deterioration is detected from two pieces of parameter information of the back ASE power and the back ASE tilt. The parameter information of the excitation light power is not used. The reason is that the excitation light power is controlled so as to be stabilized.

Figure 11:
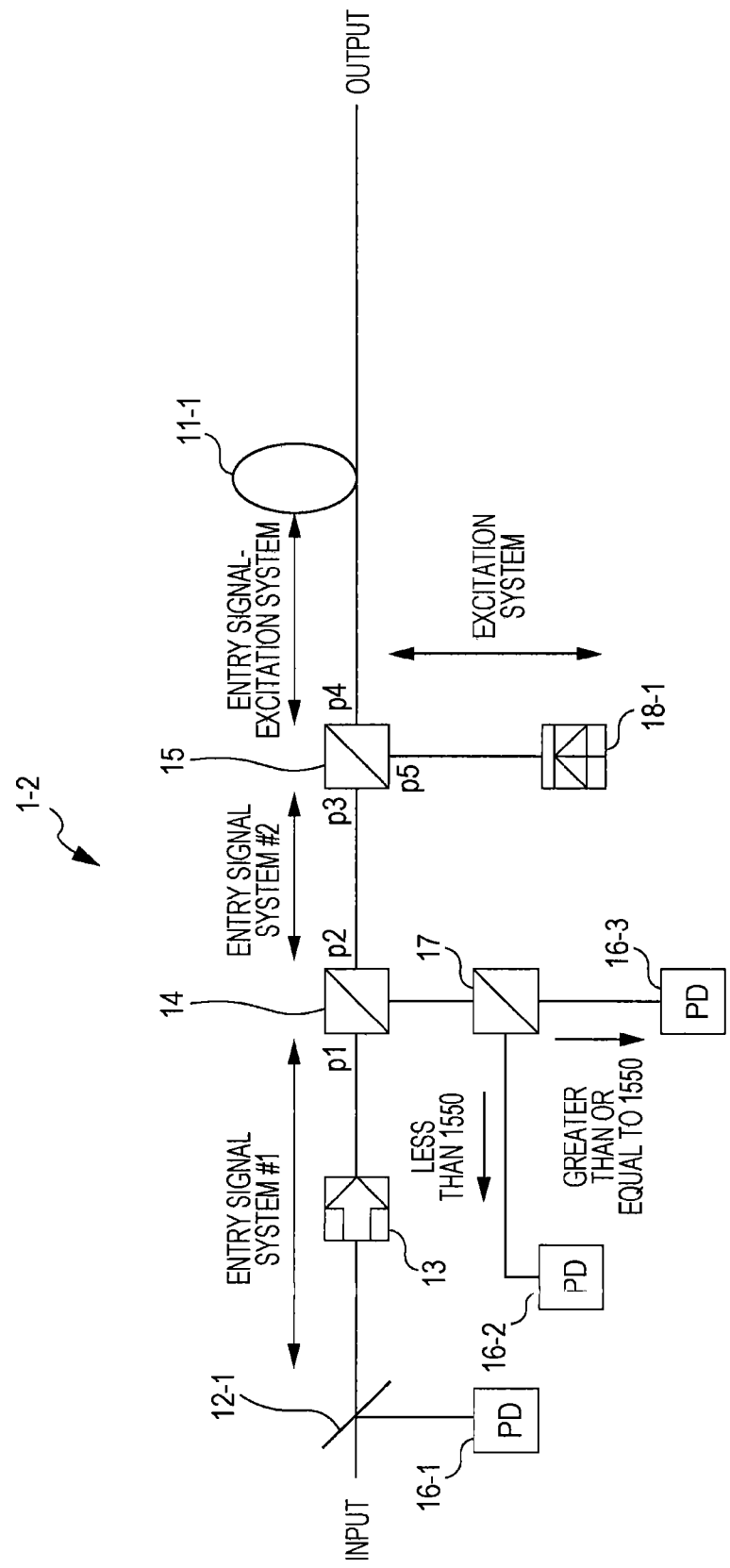
FIG. 11 is a diagram illustrating a type of a location where a loss increases.

FIG. 11 is a diagram illustrating the type of a location where a loss increases. While a block where a loss increase is assumed to occur is the same as the first embodiment, the exit signal system is not considered. The reason is that, under the condition that the excitation light power is stabilized, a change in the loss of the exit signal system does not influence the operation of the EDF 11-1 and the back ASE power.

Next, it will be described how the characteristics of the back ASE power and the back ASE tilt change with respect to the loss increase of each block.

Figure 12:
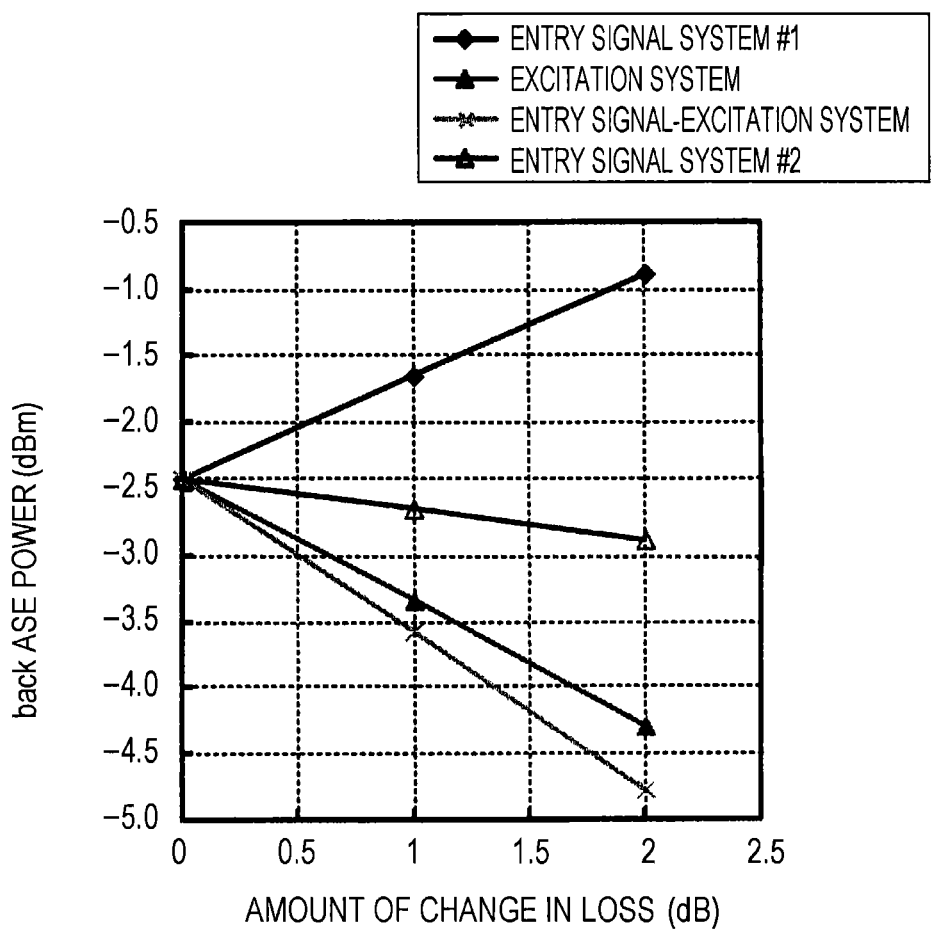
FIG. 12 is a diagram illustrating a relationship between a back ASE power and an amount of change in a loss.

FIG. 12 is a diagram illustrating a relationship between a back ASE power and an amount of change in a loss. A horizontal axis is the amount of change in a loss (dB), and a vertical axis is the back ASE power (dBm).

As for the back ASE power, when the loss of the excitation system has increased, the excitation light power to be input to the EDF 11-1 decreases, and hence the gain of the EDF 11-1 decreases. Therefore, the back ASE also decreases.

When the loss of the entry signal system #1 has increased, while the signal light input power to be input to the EDF 11-1 is reduced, since the excitation light power remains stabilized, the output of the EDF 11-1 changes very little. Accordingly, the gain of the EDF 11-1 turns out to increase by the decreased amount of input power. The back ASE power also increases by this increased amount.

When the loss of the entry signal system #2 has increased, while the back ASE output from the EDF 11-1 has been increased, since the back ASE attenuates owing to the loss of the entry signal system #2, the back ASE is cancelled out and changes very little.

When the loss of the entry signal-excitation system has increased, the signal light power to be input to the EDF 11-1 is reduced, and hence, the increase of the back ASE power and the decease of the back ASE due to the reduction of the excitation light power to be input to the EDF 11-1 cancel out each other. Therefore, as a result, the back ASE output from the EDF 11-1 changes very little. However, since the back ASE passes through a loss increase portion in a path before entering a monitor and hence power reduction occurs, the back ASE turns out to be finally reduced.

Figure 13:
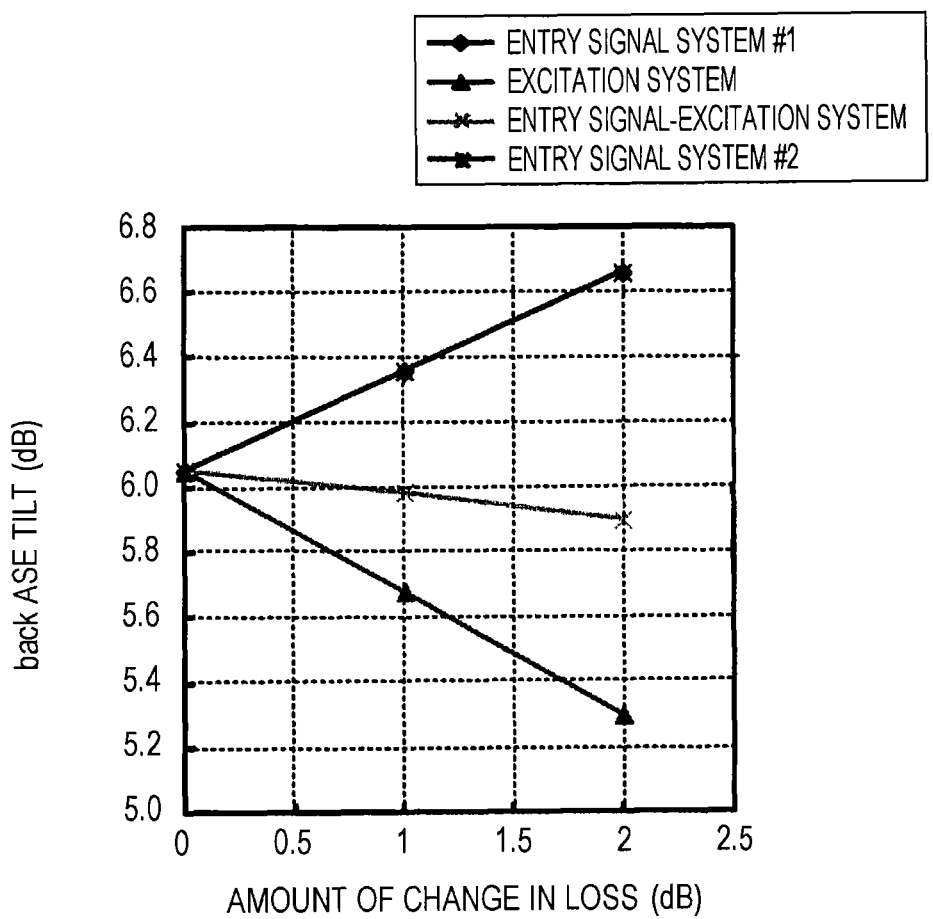
FIG. 13 is a diagram illustrating a relationship between a back ASE tilt and an amount of change in a loss.

FIG. 13 is a diagram illustrating a relationship between a back ASE tilt and an amount of change in a loss. A horizontal axis is the amount of change in a loss (dB), and a vertical axis is the back ASE tilt (dB).

As for the back ASE tilt, when the loss of the excitation system has increased, the gain of the EDF 11-1 has decreased and hence, the back ASE power generated from the EDF 11-1 decreases. When the gain of the EDF 11-1 has changed, a gain significantly changes on a short wavelength side, and hence, the tilt of the back ASE turns out to decrease.

When the losses of the entry signal systems #1 and #2 have increased, the gain of the EDF 11-1 increases. Therefore, the tilt of the back ASE increases. When the loss of the entry signal-excitation system has increased, the gain of the EDF 11-1 changes very little. Therefore, the back ASE power does not change, and the back ASE tilt also changes very little.

Next, a table will be described where a relationship between a loss-increase block and parameter information is summed up. FIG. 14 is a diagram illustrating a table where a relationship between a loss-increase block and parameter information is summed up.

As a state illustrated in a table T2, a behavior is exhibited where when the loss of the entry signal system #1 has increased, the back ASE power and the back ASE tilt increase. In addition, a behavior is exhibited where when the loss of the excitation system has increased, the back ASE power and the back ASE tilt decrease.

Furthermore, a behavior is exhibited where when the loss of the entry signal-excitation system has increased, the back ASE power decreases, and the back ASE tilt does not change. Furthermore, a behavior is exhibited where when the loss of the entry signal system #2 has increased, while the back ASE power does not change, the back ASE tilt increases.

As may be seen from the table T2, it is understood that the behavior patterns of two of the back ASE power and the back ASE tilt exhibit unique behaviors depending on loss-increase blocks without overlapping with each other.

The NF deterioration detector 26b stores therein the table T2 in advance, and it may be possible to identify a loss-increase block on the basis of the amount of change in the back ASE tilt and the amount of change in the back ASE power.

In addition, since the loss deterioration of three blocks including the entry signal system #1, the entry signal system #2, and the entry signal-excitation system occurs with no change as the NF deterioration, a user is notified with an NF deterioration alarm being output.

In addition, when the loss of the excitation system has been detected, which does not indicate NF deterioration, it may be possible to promptly identify the malfunctioning point of the optical amplifying device 1-2 by also outputting an alarm or the like for the loss detection of the excitation system.

Next, an example of the specific numerical value setting of each component configuring the optical amplifying device 1-2 will be described. Here, as the wavelength filter 17, a filter whose boundary is 1550 nm is used. It is assumed that excitation is adopted where the excitation light wavelengths of the two LDs 18-1 and 18-2 are 0.98 μm.

It is assumed that the number of wavelengths of the optical amplifying device is 40 waves in a C band. It is assumed that an input level is −20 dBm/ch. It is assumed that a gain target value is 23 dB. It is assumed that the lengths of the EDF 11-1 and the EDF 11-2 are 11 m and 14 m, respectively. The LD 18-1 is caused to emit light with being maintained at 130 mW. The initial value of the back ASE power to be preliminarily stored is −2.4 dBm from FIG. 12, and the back ASE tilt initial value is 6.1 dB from FIG. 13.

It is assumed that a threshold value for determining that the back ASE power has increased is, for example, +0.8 dB and a threshold value for determining that the back ASE power has decreased is −1.0 dB. It is assumed that a threshold value for determining that the back ASE tilt has increased is, for example, +0.3 dB and a threshold value for determining that the back ASE tilt has decreased is −0.4 dB. Using the threshold value, it may be possible to detect a loss increase when the loss of each block has been deteriorated by 1 dB or more. Accordingly, it may also be possible to detect NF deterioration when an NF has been deteriorated by 1 dB or more.

Next, as an example of an actual operation, a flow will be described when the loss of the entry signal system #1 has increased by 2 dB. First, as illustrated in FIG. 12, the back ASE power increases by 1.5 dB. Since the threshold value for determining that the back ASE power has increased is +0.8 dB, it is determined that the back ASE power has increased.

As illustrated in FIG. 13, the back ASE tilt increases by 0.6 dB. Since the threshold value for determining that the back ASE tilt has increased is +0.3 dB, it is determined that the back ASE tilt has increased.

When the above-mentioned result is compared with the table T2 in FIG. 14, it may be possible to determine that the loss of the entry signal system #1 has increased, and it may be possible to raise an alarm for the NF deterioration detection.

Figure 15:
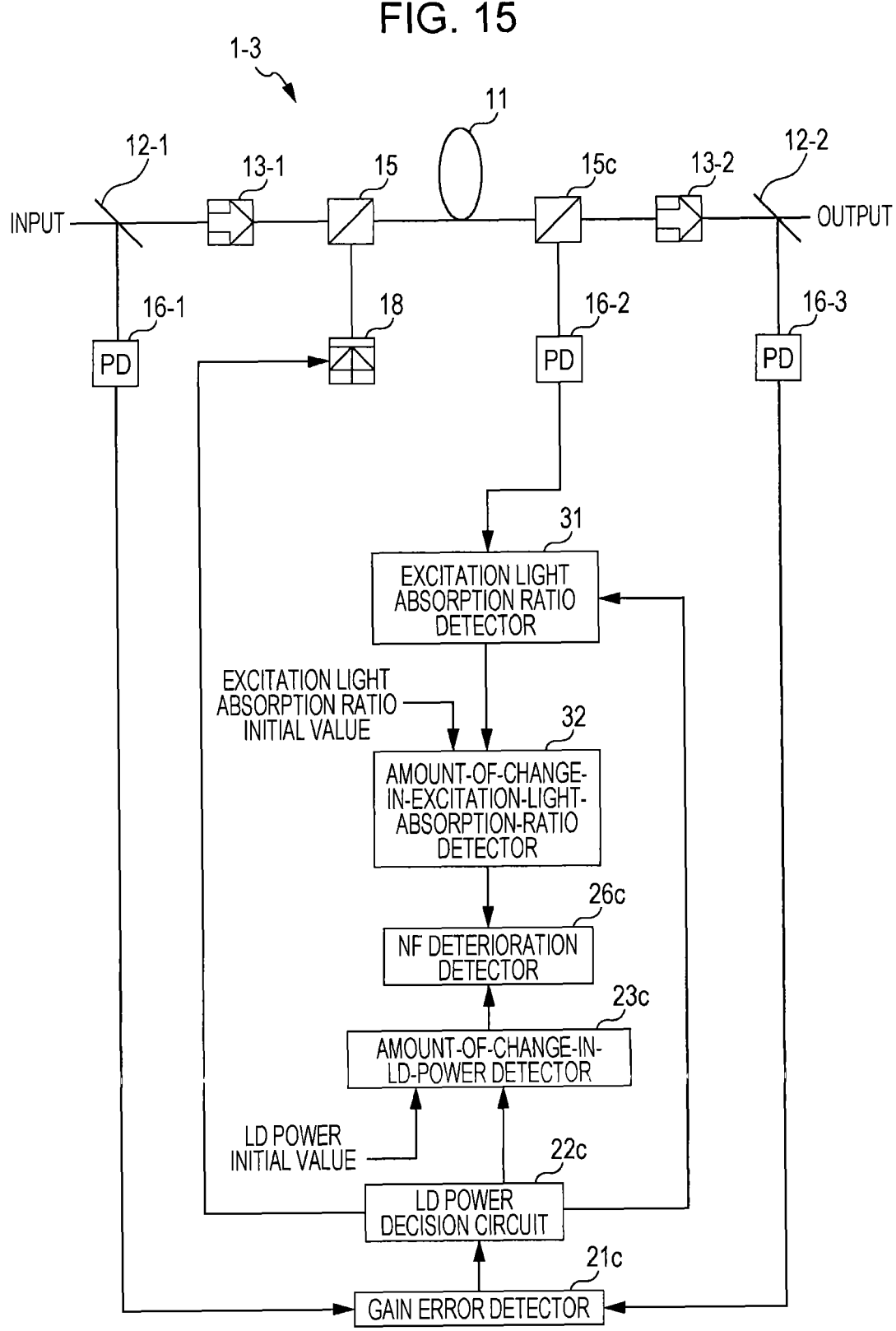
FIG. 15 is a diagram illustrating an example of a configuration of an optical amplifying device.

Next, an optical amplifying device of a third embodiment will be described using FIG. 15 to FIG. 19. FIG. 15 is a diagram illustrating an example of the configuration of the optical amplifying device. In an optical amplifying device 1-3 of the third embodiment, NF deterioration is detected from two pieces of parameter information including an excitation light power and an excitation light absorption ratio.

The optical amplifying device 1-3 includes an EDF 11, signal light demultiplexers 12-1 and 12-2, isolators 13-1 and 13-2, an excitation light multiplexer 15, an excitation light demultiplexer 15c, PDs 16-1 to 16-3, an LD 18, a gain error detector 21c, an LD power decision circuit 22c, an amount-of-change-in-LD-power detector 23c, an excitation light absorption ratio detector 31, an amount-of-change-in-excitation-light-absorption-ratio detector 32, and an NF deterioration detector 26c.

In addition, the light loss detector 1b in FIG. 1 includes the functions of the amount-of-change-in-LD-power detector 23c and the amount-of-change-in-excitation-light-absorption-ratio detector 32. The NF deterioration detector 1c in FIG. 1 includes the function of the NF deterioration detector 26c.

The signal light demultiplexer 12-1 splits signal light, input to the optical amplifying device 1-3, into two. One of the split signal light is output to the isolator 13-1, and the other of the split signal light is output to the PD 16-1. The isolator 13-1 outputs the received signal light to the excitation light multiplexer 15.

The excitation light multiplexer 15 multiplexes the signal light output from the isolator 13-1 and excitation light output from the LD 18, and causes the multiplexed light to enter the EDF 11, thereby forward pumping the EDF 11. The EDF 11 causes the optical power of the signal light to be amplified owing to stimulated emission due to $Er^{3+}$ ion excitation.

The excitation light demultiplexer 15c demultiplexes amplified signal light and excitation light not used for excitation, from output light from the EDF 11, outputs the amplified signal light to the isolator 13-2, and outputs the excitation light to the PD 16-2.

The isolator 13-2 outputs the amplified signal light output from the EDF 11 to the signal light demultiplexer 12-2. The signal light demultiplexer 12-2 splits the signal light output from the isolator 13-2 into two, and outputs one of the signal light and the other of the signal light to a subsequent stage and the PD 16-3, respectively.

The PD 16-1 monitors the power of the signal light output from the signal light demultiplexer 12-1, and generates an electric input power signal. In addition, the PD 16-3 monitors the power of the signal light output from the signal light demultiplexer 12-2, and generates an electric output power signal.

The gain error detector 21c detects an error with respect to a gain to be a target, on the basis of the input power signal and the output power signal. The LD power decision circuit 22c decides an excitation light power so that the detected gain error is reduced, and outputs, to the LD 18, a driving signal used for causing the decided excitation light power to be output from the LD 18. The LD 18 emits excitation light with an excitation power based on the driving signal.

The amount-of-change-in-LD-power detector 23c detects the amount of change in an LD power on the basis of an LD power decision value output from the LD power decision circuit 22c and an LD power initial value stored in advance.

On the other hand, the PD 16-2 monitors the power of the excitation light output from the excitation light demultiplexer 15c, and generates an electric excitation power signal. The excitation light absorption ratio detector 31 detects an excitation light absorption ratio from the excitation power signal and the power of the excitation light emitted from the LU 18 and recognized in advance.

Here, when it is assumed that the level of the excitation power signal output from the PD 16-2 is A and the power of the excitation light emitted from the LD 18 is B (an electric level), an excitation light absorption ratio r is calculated from the following Expression (2).

$$r(\text{dB}) = 10 \log_{10}(B/A) \qquad (2)$$

The amount-of-change-in-excitation-light-absorption-ratio detector 32 detects the amount of change in the excitation light absorption ratio on the basis of the excitation light absorption ratio detected in the excitation light absorption ratio detector 31 and an excitation light absorption ratio initial value stored in advance.

The NF deterioration detector 26c detects NF deterioration on the basis of the amount of change in an LD power detected in the amount-of-change-in-LD-power detector 23c and the amount of change in an excitation light absorption ratio detected in the amount-of-change-in-excitation-light-absorption-ratio detector 32. In addition, the NF deterioration detector 26c notifies the outside of a detection result (for example, when the NF deterioration exceeding a normal range has been detected, an alarm is output or the like).

In addition, the above-mentioned LD power initial value and excitation light absorption ratio initial value are stored in a storage unit not illustrated, and may be arbitrarily set from the outside.

As described above, in the optical amplifying device 1-3, using the excitation light absorption ratio indicating how much excitation light is absorbed in the EDF 11, in place of the back ASE power and the back ASE tilt used in the first embodiment, the NF deterioration detection is performed.

In addition, as illustrated above, the excitation light absorption ratio is a ratio between the power of excitation light emitted in the LD 18 and the excitation light power leaking from the output of the EDF 11.

Figure 16:
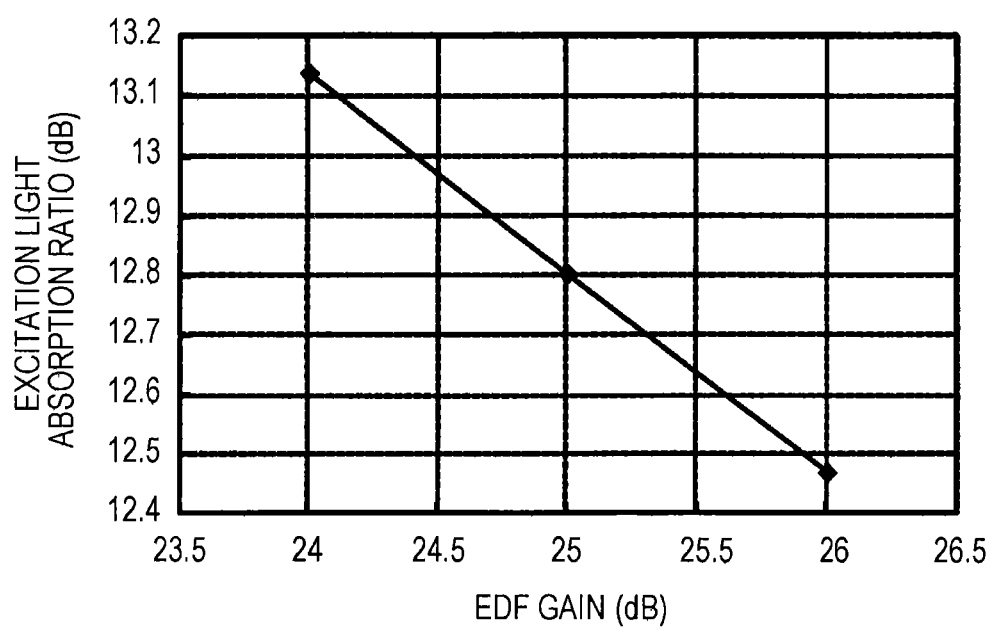
FIG. 16 is a diagram illustrating a relationship between an excitation light absorption ratio and an EDF gain.

FIG. 16 is a diagram illustrating a relationship between an excitation light absorption ratio and an EDF gain. A horizontal axis is an EDF gain (dB), and a vertical axis is an excitation light absorption ratio (dB). The drawing illustrates a relationship between the excitation light absorption ratio and the EDF gain in the case of the EDF 11 with 18 m.

Figure 17:
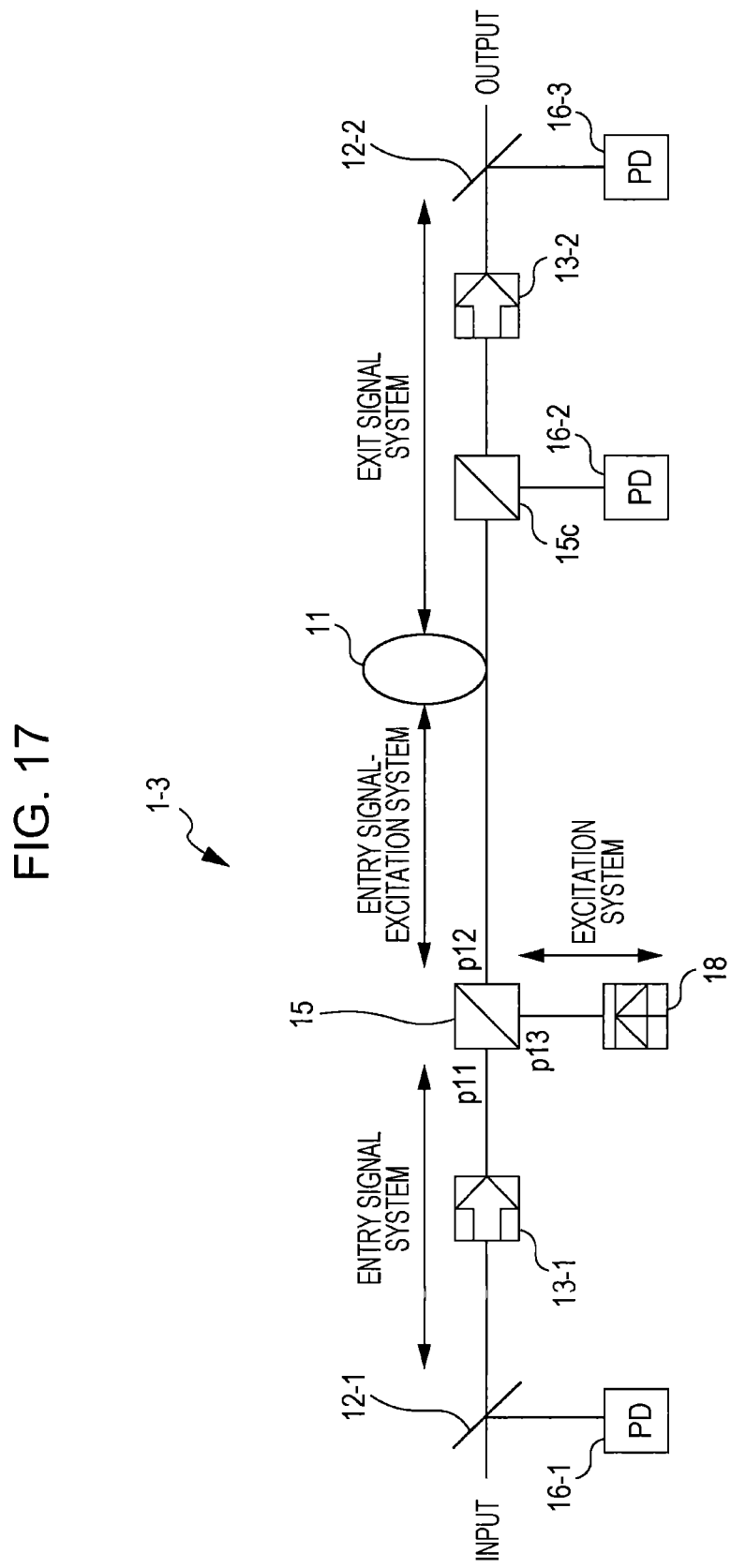
FIG. 17 is a diagram illustrating a type of a location where a loss increases.

Next, the type of a location where a loss increases will be described. FIG. 17 is a diagram illustrating the type of a location where a loss increases. In the optical amplifying device 1-3, it may be possible to divide a location where a loss increases into four main blocks. The four blocks include an entry signal system, an entry signal-excitation system, an exit signal system, and an excitation system.

The entry signal system ranges from an input end to a signal light input port p11 of the excitation light multiplexer 15. The entry signal-excitation system ranges from a multiplexed-light output port p12 of the excitation light multiplexer 15 to the input end of the EDF 11.

Furthermore, the exit signal system corresponds to a range subsequent to the output end of the EDF 11, and the excitation system ranges from the LD 18 to an excitation light input port p13 of the excitation light multiplexer 15.

Next, it will be described how the characteristics of the excitation light power and the excitation light absorption ratio change with respect to the loss increase of each block. Since the excitation light power has already been described above in FIG. 6 in the first embodiment, the description thereof will be omitted.

Figure 18:
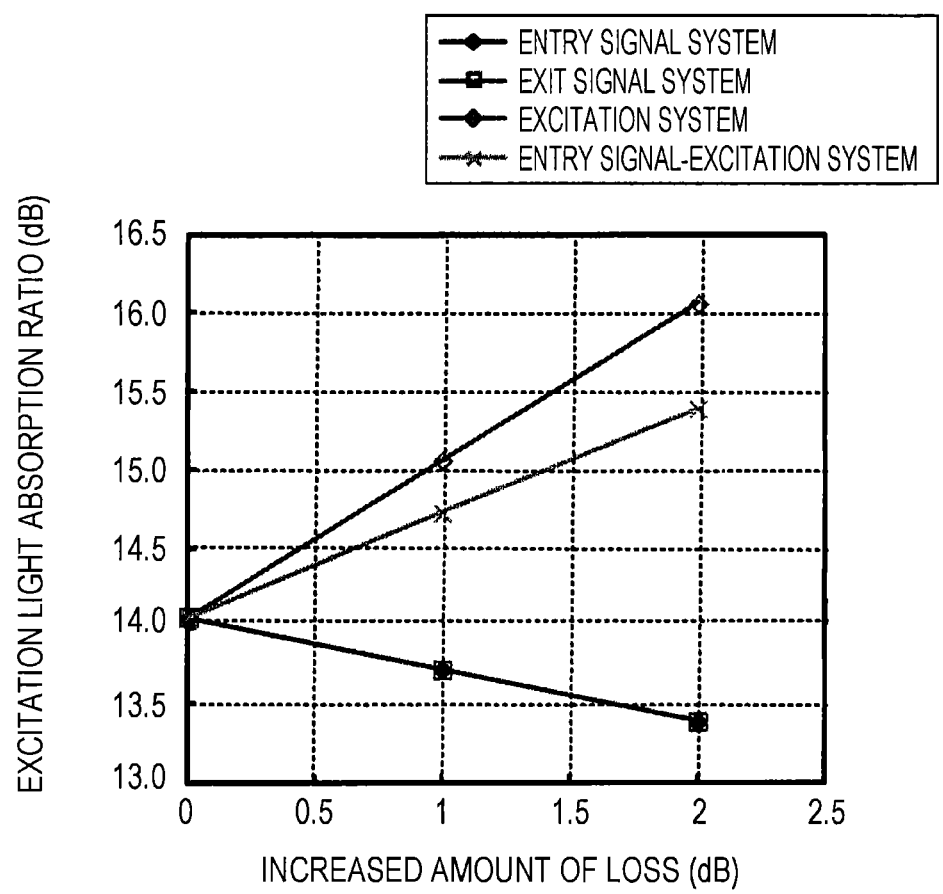
FIG. 18 is a diagram illustrating a relationship between an excitation light absorption ratio and an increased amount of a loss.

FIG. 18 is a diagram illustrating a relationship between an excitation light absorption ratio and an increased amount of a loss. A horizontal axis is the increased amount of a loss (dB), and a vertical axis is the excitation light absorption ratio (dB).

When the loss of the excitation system has increased, the power of the LD 18 becomes high so that the excitation light power input to the EDF 11 becomes the same, and hence, the EDF gain does not change. Therefore, while the excitation light absorption ratio in the EDF 11 itself does not change, the monitored excitation light absorption ratio turns out to increase by the increased amount of a loss in the excitation system, as a whole.

When the loss of the entry signal system has increased, since the EDF gain increases, the excitation light absorption ratio decreases. When the loss of the exit signal system has increased, since the EDF gain also increases, the excitation light absorption ratio decreases.

When the loss of the entry signal-excitation system has increased, since the power of the LD 18 increases by the increased amount of the loss of the excitation system, the observed excitation light absorption ratio increases by the amount of a loss with no change in the EDF gain. When the loss of the signal system has increased, the EDF gain increases and an EDF absorption ratio decreases. Since a decreased amount is relatively smaller than an increased amount, the absorption ratio appears to increase with respect to a loss increase, as a whole.

Next, a table will be described where a relationship between the above-mentioned loss-increase block and parameter information is summed up. FIG. 19 is a diagram illustrating a table where a relationship between a loss-increase block and parameter information is summed up.

As a state illustrated in a table T3, a behavior is exhibited where when the loss of the entry signal system has increased, the excitation light power does not change, and the excitation light absorption ratio decreases. In addition, a behavior is exhibited where when the loss of the exit signal system has increased, the excitation light power increases and the excitation light absorption ratio decreases.

Furthermore, a behavior is exhibited where when the loss of the excitation system has increased, the excitation light power and the excitation light absorption ratio increase. In addition, furthermore, a behavior is exhibited where when the loss of the entry signal-excitation system has increased, the excitation light power and the excitation light absorption ratio increase.

In the table T3, there is two loss-increase blocks where all behavior patterns of two of the excitation light power and the excitation light absorption ratio coincide with each other, and these are the excitation system and the entry signal-excitation system. While the excitation system does not relate to the NF deterioration, the entry signal-excitation system relates to the NF deterioration.

Accordingly, when considering a desirable condition where an alarm is to be emitted at the time of the NF deterioration, a user is notified of an alarm under the condition of the increase of the excitation light power and the increase of the excitation light absorption ratio. In addition, when the loss of the excitation system has increased, an alarm is also emitted.

In addition, when the losses of the exit signal system and the excitation system have been detected, which does not indicate NF deterioration, it may be possible to promptly identify the malfunctioning point of the optical amplifying device 1-3 by also outputting an alarm or the like for the loss detection of these systems.

Next, an example of the specific numerical value setting of each component configuring the optical amplifying device 1-3 will be described. It is assumed that excitation is adopted where an excitation light wavelength is 0.98 μm. It is assumed that the number of wavelengths of the optical amplifying device is 40 waves in a C band.

It is assumed that an input level is −20 dBm/ch. It is assumed that a gain target value is 23 dB. It is assumed that the length of the EDF 11 is 18 m. The initial value of the excitation light power to be stored in advance is 22.6 dBm as may be seen from FIG. 6, and the initial value of the excitation light absorption ratio is 14.1 dB as may be seen from FIG. 18.

It is assumed that a threshold value for determining that the excitation light power has increased is, for example, +1.0 dB. It is assumed that a threshold value for determining that the excitation light absorption ratio has increased is, for example, +0.8 dB and a threshold value for determining that the excitation light absorption ratio has decreased is −0.4 dB.

Using the threshold value, it may be possible to detect a loss increase when the loss of each block has been deteriorated by 1 dB or more. Accordingly, it may also be possible to detect NF deterioration when an NF has been deteriorated by 1 dB or more.

Next, as an example of an actual operation, a flow will be described when the loss of the entry signal system has increased by 2 dB. First, as illustrated in FIG. 6, the excitation light power increases by 0.2 dBm. Since the threshold value for determining that the excitation light power has increased is +1.0 dB, it is determined that the excitation light power does not change.

As illustrated in FIG. 18, the excitation light absorption ratio decreases by 0.6 dB. Since the threshold value for determining that the excitation light absorption ratio has decreased is −0.4 dB, it is determined that the excitation light absorption ratio has decreased. When the above-mentioned result is compared with the table T3 in FIG. 19, it may be possible to determine that the loss of the entry signal system has increased, and it may be possible to raise an alarm for the NF deterioration detection.

Figure 20:
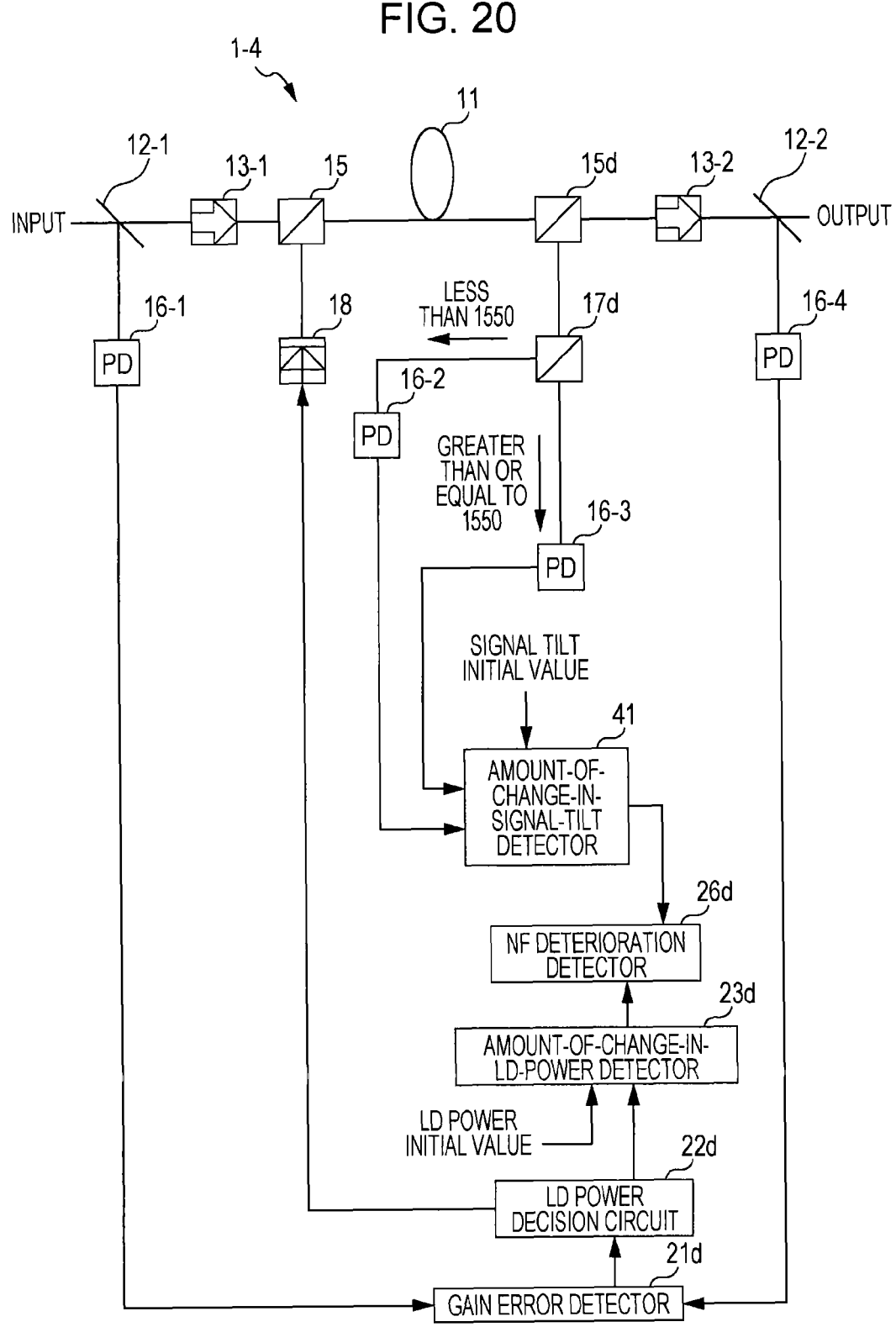
FIG. 20 is a diagram illustrating an example of a configuration of an optical amplifying device.

Next, an optical amplifying device of a fourth embodiment will be described using FIG. 20 to FIG. 23. FIG. 20 is a diagram illustrating an example of the configuration of the optical amplifying device. An optical amplifying device 1-4 includes an EDF 11, signal light demultiplexers 12-1 and 12-2, isolators 13-1, 13-2, an excitation light multiplexer 15, a signal light demultiplexer 15d, PDs 16-1 to 16-4, a wavelength filter 17d, an LD 18, a gain error detector 21d, an LD power decision circuit 22d, an amount-of-change-in-LD-power detector 23d, an NF deterioration detector 26d, and an amount-of-change-in-signal-tilt detector 41.

In addition, the light loss detector 1b in FIG. 1 includes the functions of the amount-of-change-in-LD-power detector 23d and the amount-of-change-in-signal-tilt detector 41. The NF deterioration detector 1c in FIG. 1 includes the function of the NF deterioration detector 26d.

The signal light demultiplexer 12-1 splits signal light, input to the optical amplifying device 1-4, into two. One of the split signal light is output to the isolator 13-1, and the other of the split signal light is output to the PD 16-1. The isolator 13-1 outputs the received signal light to the excitation light multiplexer 15.

The excitation light multiplexer 15 multiplexes the signal light output from the isolator 13-1 and the excitation light output from the LD 18, and causes the multiplexed light to enter the EDF 11, thereby forward pumping the EDF 11. The EDF 11 causes the optical power of the signal light to be amplified owing to stimulated emission due to $Er^{3+}$ ion excitation.

The isolator 13-2 outputs the signal light, amplified and output by the EDF 11, to the signal light demultiplexer 12-2. The signal light demultiplexer 12-2 splits the signal light output from the isolator 13-2 into two, and outputs one of the signal light and the other of the signal light to a subsequent stage and the PD 16-4, respectively.

The PD 16-1 monitors the power of the signal light output from the signal light demultiplexer 12-1, and generates an electric input power signal. In addition, the PD 16-4 monitors the power of the signal light output from the signal light demultiplexer 12-2, and generates an electric output power signal.

The gain error detector 21d detects an error with respect to a gain to be a target, on the basis of the input power signal and the output power signal. The LD power decision circuit 22d decides an excitation light power so that the detected gain error is reduced, and outputs, to the LD 18, a driving signal used for causing the decided an excitation light power to be output from the LD 18. The LD 18 emits excitation light with an excitation power based on the driving signal.

The amount-of-change-in-LD-power detector 23d detects the amount of change in an LD power on the basis of an LD power decision value decided in the LD power decision circuit 22d and an LD power initial value stored in advance.

On the other hand, the wavelength filter 17d performs filtering processing on the signal light output in a demultiplexing manner from the signal light demultiplexer 15d, and splits the signal light into two bands on a short wavelength side and a long wavelength side to output the two bands. In this example, the signal light less than 1550 nm is output to the PD 16-2 as the short wavelength side, and the signal light greater than or equal to 1550 nm is output to the PD 16-3 as the long wavelength side.

The PD 16-2 monitors the power of the short wavelength-side signal light less than 1550 nm, and generates an electric short wavelength-side power signal. In addition, the PD 16-3 monitors the power of the long wavelength-side signal light greater than or equal to 1550 nm, and generates an electric long wavelength-side power signal.

The amount-of-change-in-signal-tilt detector 41 calculates the tilt of the signal light (also referred to as a signal tilt) from the short wavelength-side power signal and the long wavelength-side power signal. In addition, on the basis of the calculated signal tilt and a signal tilt initial value stored in advance, the amount-of-change-in-signal-tilt detector 41 detects the amount of change in the signal tilt.

The NF deterioration detector 26d detects the NF deterioration on the basis of the amount of change in the LD power detected in the amount-of-change-in-LD-power detector 23d and the amount of change in the signal tilt detected in the amount-of-change-in-signal-tilt detector 41. In addition, the NF deterioration detector 26 notifies the outside of the detection result (for example, output an alarm when NF deterioration exceeding a normal range has been detected, or the like).

In addition, the above-mentioned LD power initial value and signal tilt initial value are stored in a storage unit not illustrated, and may be arbitrarily set from the outside.

As described above, in the optical amplifying device of the fourth embodiment, the output signal of the EDF 11 is separated using, for example, a demultiplexer whose splitting ratio is 20:1. Furthermore, the separated light is separated into a wavelength less than 1550 nm and a wavelength greater than or equal to 1550 nm, the power of each wavelength is monitored, and the power greater than or equal to 1550 nm is subtracted from the power less than 1550 nm, thereby calculating the signal tilt. Accordingly, the signal tilt is used in place of the measurement of the excitation light absorption ratio.

In addition, as described above, when the EDF gain has increased, the excitation light absorption ratio decreases. However, since the signal tilt of the EDF 11 has the characteristic of increasing when the EDF gain has increased, it may be possible to replace the excitation light absorption ratio with the signal tilt.

Figure 21:
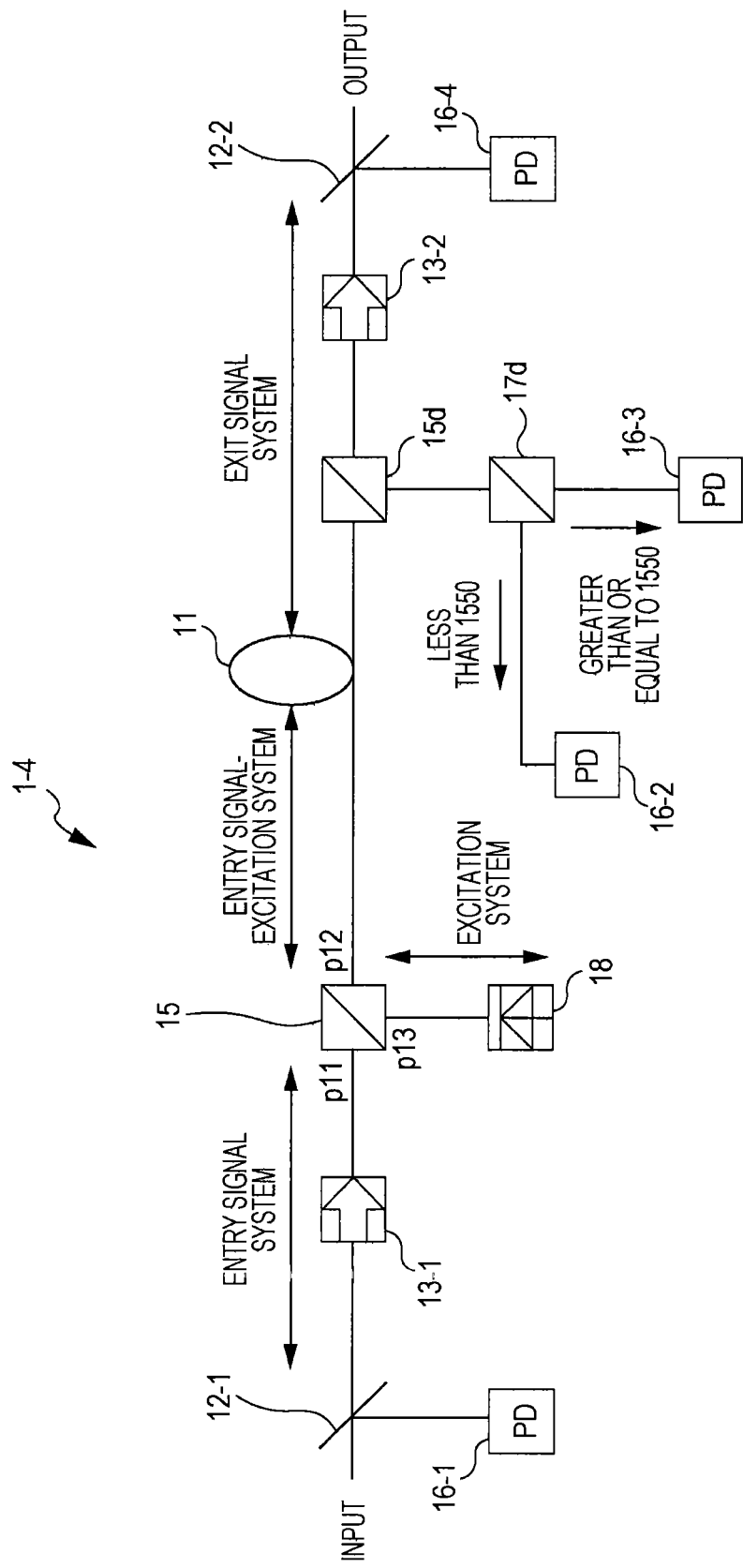
FIG. 21 is a diagram illustrating a type of a location where a loss increases.

Next, the type of a location where a loss increases will be described. FIG. 21 is a diagram illustrating the type of a location where a loss increases. In the optical amplifying device 1-4, it may be possible to divide a location where a loss increases into four main blocks. The four blocks include an entry signal system, an entry signal-excitation system, an exit signal system, and an excitation system.

The entry signal system ranges from an input end to a signal light input port p11 of the excitation light multiplexer 15. The entry signal-excitation system ranges from a multiplexed-light output port p12 of the excitation light multiplexer 15 to the input end of the EDF 11. The exit signal system corresponds to a range subsequent to the output end of the EDF 11, and the excitation system ranges from the LD 18 to an excitation light input port p13 of the excitation light multiplexer 15.

Next, it will be described how the characteristics of the excitation light power and the signal tilt change with respect to the loss increase of each block. Since the excitation light power has already been described above in FIG. 6 in the first embodiment, the description thereof will be omitted.

Figure 22:
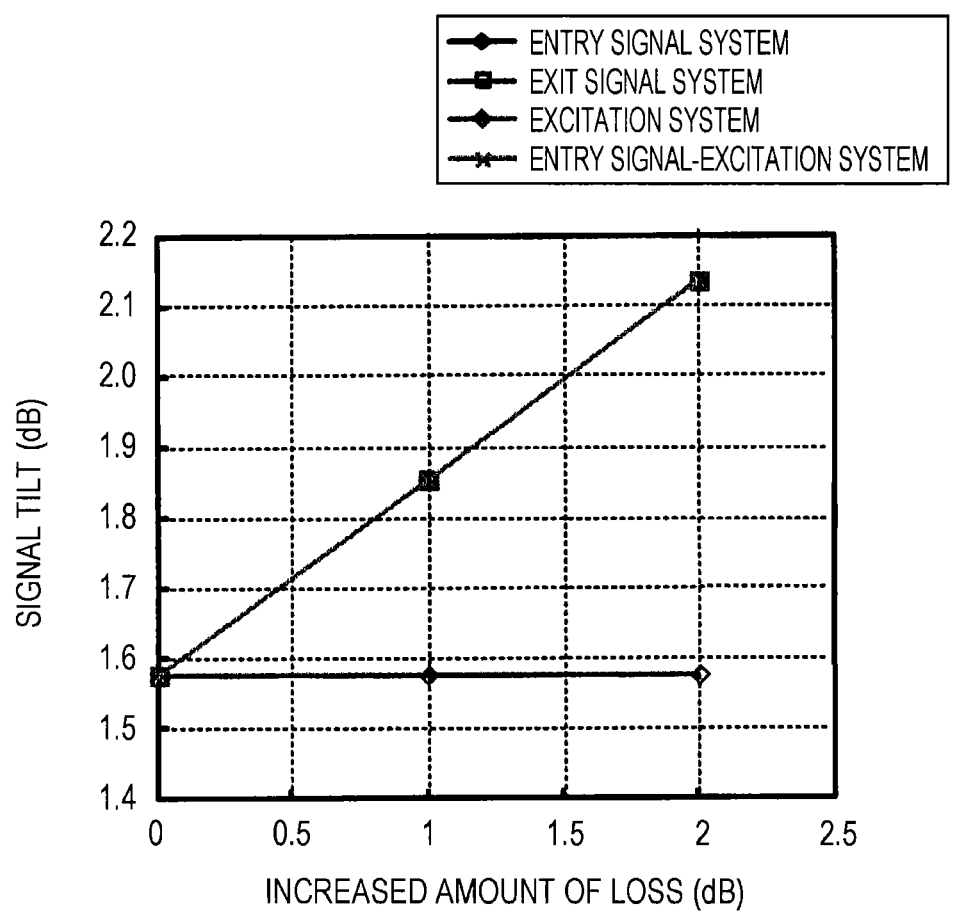
FIG. 22 is a diagram illustrating a relationship between a signal tilt and an increased amount of a loss.

FIG. 22 is a diagram illustrating a relationship between a signal tilt and an increased amount of a loss. A horizontal axis is the increased amount of a loss (dB), and a vertical axis is the signal tilt (dB).

When the loss of the excitation system has increased, the power of the LD 18 becomes high so that the excitation light power input to the EDF 11 becomes the same, and hence, the EDF gain does not change. Therefore, the signal tilt does not change. Since the EDF gain increases when the loss of any one of the entry signal system, the exit signal system, and the entry signal-excitation system has increased, the signal tilt increases.

Next, a table will be described where a relationship between the above-mentioned loss-increase block and parameter information is summed up. FIG. 23 is a diagram illustrating a table where a relationship between a loss-increase block and parameter information is summed up.

As a state illustrated in a table T4, a behavior is exhibited where when the loss of the entry signal system has increased, the excitation light power does not change, and the signal tilt increases. In addition, a behavior is exhibited where when the loss of the exit signal system has increased, the excitation light power and the signal tilt increase.

A behavior is exhibited where when the loss of the excitation system has increased, the excitation light power increases and the signal tilt does not change. A behavior is exhibited where when the loss of the entry signal-excitation system has increased, the excitation light power and the signal tilt increase.

In the table T4, there is two loss-increase blocks where all behavior patterns of two of the excitation light power and the signal tilt coincide with each other, and these are the exit signal system and the entry signal-excitation system. While the exit signal system does not relate to the NF deterioration, the entry signal-excitation system relates to the NF deterioration.

Accordingly, when considering a desirable condition where an alarm is to be emitted at the time of the NF deterioration, a user is notified of an alarm under the condition of the increase of the excitation light power and the increase of the signal tilt. In addition, when the loss of the entry signal system has increased, an alarm is also emitted.

In addition, when the losses of the exit signal system and the excitation system have been detected, which does not indicate NF deterioration, it may be possible to promptly identify the malfunctioning point of the optical amplifying device 1-4 by also outputting an alarm or the like for the loss detection of these systems.

Next, an example of the specific numerical value setting of each component configuring the optical amplifying device 1-4 will be described. It is assumed that excitation is adopted where an excitation light wavelength is 0.98 μm. It is assumed that the number of wavelengths of the optical amplifying device is 40 waves in a C band.

It is assumed that an input level is −20 dBm/ch. It is assumed that a gain target value is 23 dB. It is assumed that the length of the EDF 11 is 18 m. The initial value of the excitation light power to be stored in advance is 22.6 dBm as may be seen from FIG. 6, and the initial value of the signal tilt is 14.1 dB as may be seen from FIG. 22.

It is assumed that a threshold value for determining that the excitation light power has increased is, for example, +1.0 dB.

It is assumed that a threshold value for determining that the signal tilt has increased is, for example, +0.3 dB. Using the threshold value, it may be possible to detect a loss increase when the loss of each block has been deteriorated by 1 dB or more. Accordingly, it may also be possible to detect NF deterioration when an NF has been deteriorated by 1 dB or more.

Next, as an example of an actual operation, a flow will be described when the loss of the entry signal system has increased by 2 dB. First, as illustrated in FIG. 6, the excitation light power increases by 0.2 dBm. Since the threshold value for determining that the excitation light power has increased is +1.0 dB, it is determined that the excitation light power does not change.

As illustrated in FIG. 22, the signal tilt increases by 0.5 dB. Since the threshold value for determining that the signal tilt has increased is +0.3 dB, it is determined that the signal tilt has increased. When the above-mentioned result is compared with the table T4 in FIG. 23, it may be possible to determine that the loss of the entry signal system has increased, and it may be possible to raise an alarm for the NF deterioration detection.

Next, an optical transmission system will be described that includes a configuration where optical amplifying devices are subjected to multistage connection. FIG. 24 is a diagram illustrating an example of the configuration of an optical transmission system. An optical transmission system 5 performing Wavelength Division Multiplexing (WDM) optical transmission includes terminal stations (monitoring stations) 51a and 51b and optical amplifying devices 52-1 to 52-n. The optical amplifying devices 52-1 to 52-n are subjected to multistage connection on an optical fiber transmission path F.

Each of the optical amplifying devices 52-1 to 52-n includes the optical amplification medium 1a, the light loss detector 1b, and the NF deterioration detector 1c, described above in FIG. 1, and the optical amplifying devices 52-1 to 52-n are subjected to multistage connection on the optical fiber transmission path F, thereby performing optical relay amplification.

Here, it is assumed that, in the optical amplifying device 52-2, NF deterioration has been detected owing to such control as described above. In this case, when having detected the NF deterioration, the NF deterioration detector is within the optical amplifying device 52-2 superimposes the effect that the deterioration of an NF has occurred in the self-device, on monitoring signal light along with the identifier of the self, and notifies at least one of the terminal stations 51a and 51b of the effect. As the monitoring signal light, an Optical Supervisory Channel (OSC) signal or the like may be used, for example.

In this way, in the optical transmission system 5, a configuration is adopted where, using the monitoring signal light, an optical amplifying device having detected the NF deterioration notifies a station side of the effect that the deterioration of an NF has occurred in the self-device. Accordingly, it may be possible to easily identify an optical amplifier where the NF deterioration has occurred.

As described above, according to the present technology, it may be possible to detect the NF deterioration of an optical amplifier or detect in which block a loss has increased, with no cost increase.

While the embodiments have been exemplified as above, the configuration of each unit illustrated in the embodiments may be replaced with another configuration having the same function. In addition, another arbitrary configuration component or process may be added.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical amplifying device, comprising:
    an optical amplification medium configured to be excited by excitation light and amplify signal light;
    a light loss detector configured to detect a light loss of an optical component optically connected to the optical amplification medium in the amplifying device; and
    a noise figure deterioration detector configured to detect, based on the light loss detected by the light loss detector, deterioration of a noise figure of the optical amplification medium.

2. The optical amplifying device according to claim 1, wherein
    the light loss detector
    detects a change from a setting value with respect to each of parameters serving as a power of the excitation light, a power of amplified spontaneous emission light leaking from the optical amplification medium, and a tilt of the amplified spontaneous emission light, at the time of gain stabilization control for optical amplification due to the optical amplification medium, and
    detects in which optical component the light loss has occurred with respect to the optical component optically connected to the optical amplification medium, on a basis of a combination of the changes of the parameters.

3. The optical amplifying device according to claim 2, wherein
    on the input path for the optical amplification medium, an amplified spontaneous emission light demultiplexer configured to demultiplex the amplified spontaneous emission light flowing in a direction opposite to a travelling direction of the signal light and output the amplified spontaneous emission light to the light loss detector and an excitation light multiplexer configured to multiplex the signal light and the excitation light and input multiplexed light to the optical amplification medium are disposed, and
    when a range from a device input end to a signal light input port of the amplified spontaneous emission light demultiplexer is defined as a first entry signal system,
    a range from a signal light output port of the amplified spontaneous emission light demultiplexer to a signal light input port of the excitation light multiplexer is defined as a second entry signal system, and
    a range from a multiplexed-light output port of the excitation light multiplexer to an input end of the optical amplification medium is defined as an entry signal-excitation system,
    the light loss detector
    detects that the light loss has occurred in the input path-side optical component included in the range of the first entry signal system, when the power of the excitation light does not change and the power and the tilt of the amplified spontaneous emission light have increased,
    detects that the light loss has occurred in the input path-side optical component included in the range of the entry signal-excitation system, when the power of the excitation light and the tilt of the amplified spontaneous emission light have increased and the power of the amplified spontaneous emission light does not change, and
    detects that the light loss has occurred in the input path-side optical component included in the range of the second entry signal system, when the power of the excitation light and the power of the amplified spontaneous emission light do not change and the tilt of the amplified spontaneous emission light has increased.

4. The optical amplifying device according to claim 2, wherein
    on an input side of the optical amplification medium, an excitation light source configured to output the excitation light and an excitation light multiplexer configured to multiplex the signal light and the excitation light and input multiplexed light to the optical amplification medium are disposed, and
    when a range from the excitation light source to an excitation light input port of the excitation light multiplexer is defined as an excitation system, and
    a range subsequent to an output end of the optical amplification medium is defined as an exit signal system,
    the light loss detector
    detects that the light loss has occurred in the optical component included in the range of the exit signal system, when the power of the excitation light and the power and the tilt of the amplified spontaneous emission light have increased, and
    detects that the light loss has occurred in the optical component included in the range of the excitation system, when the power of the excitation light has increased and the power and the tilt of the amplified spontaneous emission light do not change.

5. The optical amplifying device according to claim 1, further comprising:
    a first optical amplification medium configured to be excited by first excitation light having a desirable power; and a second optical amplification medium configured to be located in a subsequent stage of the first optical amplification medium and in which gain stabilization control is performed using second excitation light having a variable power, wherein
    the light loss detector
    detects a change from a setting value with respect to each of parameters serving as a power of amplified spontaneous emission light leaking from the first optical amplification medium and a tilt of the amplified spontaneous emission light, and
    detects in which optical component the light loss has occurred with respect to the optical component optically connected to the first optical amplification medium, on a basis of a combination of the changes of the parameters.

6. The optical amplifying device according to claim 5, wherein
    on the input path for the first optical amplification medium, an amplified spontaneous emission light demultiplexer configured to demultiplex the amplified spontaneous emission light flowing in a direction opposite to a travelling direction of the signal light and output the amplified spontaneous emission light to the light loss detector and an excitation light multiplexer configured to multiplex the signal light and the first excitation light and input multiplexed light to the first optical amplification medium are disposed, and when a range from a device input end to a signal light input port of the amplified spontaneous emission light demultiplexer is defined as a first entry signal system, a range from a signal light output port of the amplified spontaneous emission light demultiplexer to a signal light input port of the excitation light multiplexer is defined as a second entry signal system, and a range from a multiplexed-light output port of the excitation light multiplexer to an input end of the first optical amplification medium is defined as an entry signal-excitation system, the light loss detector detects that the light loss has occurred in the input path-side optical component included in the range of the first entry signal system, when the power and the tilt of the amplified spontaneous emission light have increased, detects that the light loss has occurred in the input path-side optical component included in the range of the entry signal-excitation system, when the power of the amplified spontaneous emission light has decreased and the tilt of the amplified spontaneous emission light does not change, and detects that the light loss has occurred in the input path-side optical component included in the range of the second entry signal system, when the power of the amplified spontaneous emission light does not change and the tilt of the amplified spontaneous emission light has increased.

7. The optical amplifying device according to claim 5, wherein on an input side of the first optical amplification medium, an excitation light source configured to output the first excitation light and an excitation light multiplexer configured to multiplex the signal light and the first excitation light and input multiplexed light to the first optical amplification medium are disposed, and when a range from the excitation light source to an excitation light input port of the excitation light multiplexer is defined as an excitation system, the light loss detector detects that the light loss has occurred in the optical component included in the range of the excitation system, when the power and the tilt of the amplified spontaneous emission light have decreased.

8. The optical amplifying device according to claim 1, wherein the light loss detector detects a change from a setting value with respect to each of parameters serving as a power of the excitation light and an excitation light absorption ratio of the optical amplification medium, at the time of gain stabilization control for optical amplification due to the optical amplification medium, and detects in which optical component the light loss has occurred with respect to the optical component optically connected to the optical amplification medium, on a basis of a combination of the changes of the parameters.

9. The optical amplifying device according to claim 8, wherein on the input path for the optical amplification medium, an excitation light multiplexer configured to multiplex the signal light and the excitation light and input multiplexed light to the optical amplification medium is disposed, and when a range from a device input end to a signal light input port of the excitation light multiplexer is defined as an entry signal system, and a range from a multiplexed-light output port of the excitation light multiplexer to an input end of the optical amplification medium is defined as an entry signal-excitation system, the light loss detector detects that the light loss has occurred in the input path-side optical component included in the range of the entry signal system, when the power of the excitation light does not change and the excitation light absorption ratio has decreased, and detects that the light loss has occurred in the input path-side optical component included in the range of the entry signal-excitation system, when the power of the excitation light and the excitation light absorption ratio have increased.

10. The optical amplifying device according to claim 8, wherein on an input side of the optical amplification medium, an excitation light source configured to output the excitation light and an excitation light multiplexer configured to multiplex the signal light and the excitation light and input multiplexed light to the optical amplification medium are disposed, and when a range from the excitation light source to an excitation light input port of the excitation light multiplexer is defined as an excitation system, and a range subsequent to an output end of the optical amplification medium is defined as an exit signal system, the light loss detector detects that the light loss has occurred in the optical component included in the range of the exit signal system, when the power of the excitation light has increased and the excitation light absorption ratio has decreased, and detects that the light loss has occurred in the optical component included in the range of the excitation system, when the power of the excitation light and the excitation light absorption ratio have increased.

11. The optical amplifying device according to claim 1, wherein the light loss detector detects a change from a setting value with respect to each of parameters serving as a power of the excitation light and a tilt of amplified signal light amplified and output from the optical amplification medium, at the time of gain stabilization control for optical amplification due to the optical amplification medium, and detects in which optical component the light loss has occurred with respect to the optical component optically connected to the optical amplification medium, on a basis of a combination of the changes of the parameters.

12. The optical amplifying device according to claim 11, wherein on the input path for the optical amplification medium, an excitation light multiplexer configured to multiplex the signal light and the excitation light and input multiplexed light to the optical amplification medium is disposed, and when a range from a device input end to a signal light input port of the excitation light multiplexer is defined as an entry signal system, and a range from a multiplexed-light output port of the excitation light multiplexer to an input end of the optical amplification medium is defined as an entry signal-excitation system, the light loss detector detects that the light loss has occurred in the input path-side optical component included in the range of the entry signal system, when the power of the excitation light does not change and the tilt of the amplified signal light has increased, and detects that the light loss has occurred in the input path-side optical component included in the range of the entry signal-excitation system, when the power of the excitation light and the tilt of the amplified signal light have increased.

13. The optical amplifying device according to claim 11, wherein on an input side of the optical amplification medium, an excitation light source configured to output the excitation light and an excitation light multiplexer configured to multiplex the signal light and the excitation light and input multiplexed light to the optical amplification medium are disposed, and when a range from the excitation light source to an excitation light input port of the excitation light multiplexer is defined as an excitation system, and a range subsequent to an output end of the optical amplification medium is defined as an exit signal system, the light loss detector detects that the light loss has occurred in the optical component included in the range of the exit signal system, when the power of the excitation light and the tilt of the amplified signal light have increased, and detects that the light loss has occurred in the optical component included in the range of the excitation system, when the power of the excitation light has increased and the tilt of the amplified signal light does not change.

14. An optical transmission system, comprising:

a plurality of optical amplifying devices each of which includes an optical amplification medium configured to be excited by excitation light and amplify signal light, a light loss detector configured to detect a light loss of an optical component optically connected to the optical amplification medium in the amplifying device, and a noise figure deterioration detector configured to detect that, based on the light loss of an input path-side optical component for the optical amplification medium, deterioration of a noise figure of the optical amplification medium has occurred, wherein the plural optical amplifying devices are subjected to multistage connection on an optical fiber transmission path and perform optical relay amplification; and a monitoring station configured to perform operational monitoring for optical transmission, wherein based on a detection result of the noise figure, using monitoring signal light, the noise figure deterioration detector notifies the monitoring station of the effect that deterioration of the noise figure has occurred in a self-device.

* * * * *